(12) United States Patent
Wakabayashi et al.

(10) Patent No.: US 8,030,427 B2
(45) Date of Patent: Oct. 4, 2011

(54) CURABLE COMPOSITION

(75) Inventors: Katsuyu Wakabayashi, Settsu (JP); Masato Kusakabe, Osaka (JP)

(73) Assignee: Kaneka Corporation, Osaka (JP)

( * ) Notice: Subject to any disclaimer, the term of this patent is extended or adjusted under 35 U.S.C. 154(b) by 685 days.

(21) Appl. No.: 11/628,893

(22) PCT Filed: May 26, 2005

(86) PCT No.: PCT/JP2005/009611
§ 371 (c)(1),
(2), (4) Date: Mar. 13, 2007

(87) PCT Pub. No.: WO2005/121255
PCT Pub. Date: Dec. 22, 2005

(65) Prior Publication Data
US 2008/0051547 A1   Feb. 28, 2008

(30) Foreign Application Priority Data
Jun. 9, 2004   (JP) .................................. 2004-171884

(51) Int. Cl.
*C08G 77/06* (2006.01)
(52) U.S. Cl. ................................ 528/17; 528/34; 528/35
(58) Field of Classification Search ....................... 528/18
See application file for complete search history.

(56) References Cited

U.S. PATENT DOCUMENTS

| | | |
|---|---|---|
| 3,632,557 A | 1/1972 | Brode et al. |
| 3,661,885 A | 5/1972 | Haddick et al. |
| 3,857,825 A | 12/1974 | Streck et al. |
| 3,888,815 A | 6/1975 | Bessmer et al. |
| 3,971,751 A | 7/1976 | Isayama et al. |
| 4,449,938 A | 5/1984 | Pollak |
| 4,472,551 A | 9/1984 | White et al. |
| 4,507,469 A | 3/1985 | Mita et al. |
| 4,559,387 A | 12/1985 | Endo et al. |
| 4,562,237 A | 12/1985 | Okuno et al. |
| 4,683,250 A | 7/1987 | Mikami |
| 4,720,530 A | 1/1988 | Wurminghausen et al. |
| 4,818,790 A | 4/1989 | Ooka et al. |
| 4,873,305 A | 10/1989 | Cavezzan et al. |
| 4,910,255 A | 3/1990 | Wakabayashi et al. |
| 4,954,565 A | 9/1990 | Liles |
| 4,960,844 A | 10/1990 | Singh |
| 4,977,228 A | 12/1990 | Wakabayashi et al. |
| 5,120,379 A * | 6/1992 | Noda et al. ..................... 156/107 |
| 5,399,607 A | 3/1995 | Nanbu et al. |
| 5,554,709 A | 9/1996 | Emmerling et al. |
| 5,639,825 A | 6/1997 | Nanbu et al. |
| 5,648,427 A | 7/1997 | Fujita et al. |
| 5,807,921 A | 9/1998 | Hill et al. |
| 5,986,014 A | 11/1999 | Kusakabe et al. |
| 6,204,350 B1 | 3/2001 | Liu et al. |
| 6,207,766 B1 | 3/2001 | Doi et al. |
| 6,271,309 B1 | 8/2001 | Roberts et al. |
| 6,287,701 B1 | 9/2001 | Oochi et al. |
| 6,350,345 B1 | 2/2002 | Kotani et al. |
| 6,410,640 B1 * | 6/2002 | Fukunaga et al. ............ 524/588 |
| 6,569,980 B1 | 5/2003 | Masaoka et al. |
| 6,642,309 B2 | 11/2003 | Komitsu et al. |
| 6,703,442 B1 | 3/2004 | Ando et al. |
| 6,720,373 B2 | 4/2004 | Lin et al. |
| 7,115,695 B2 | 10/2006 | Okamoto et al. |
| 2002/0016411 A1 | 2/2002 | Ando et al. |
| 2002/0048680 A1 | 4/2002 | Yamanaka |
| 2002/0086942 A1 | 7/2002 | Fujita et al. |
| 2002/0115811 A1 | 8/2002 | Huang et al. |
| 2003/0096904 A1 | 5/2003 | Hakuta et al. |
| 2003/0176576 A1 | 9/2003 | Fujita et al. |
| 2004/0181025 A1 | 9/2004 | Schindler et al. |
| 2004/0198885 A1 * | 10/2004 | Okamoto et al. ............. 524/394 |
| 2004/0266950 A1 * | 12/2004 | Yano et al. .................... 525/100 |
| 2006/0128919 A1 | 6/2006 | Okamoto et al. |
| 2006/0252903 A1 | 11/2006 | Wakabayashi et al. |
| 2006/0264545 A1 | 11/2006 | Wakabayashi et al. |
| 2007/0167583 A1 | 7/2007 | Yano et al. |

FOREIGN PATENT DOCUMENTS

| | | |
|---|---|---|
| EP | 0538881 A2 | 4/1993 |
| EP | 546310 A2 | 6/1993 |
| EP | 0918062 A1 | 5/1999 |
| EP | 1000980 AL | 5/2000 |
| EP | 1024170 A1 | 8/2000 |
| EP | 1 471 113 A1 | 10/2004 |
| JP | 03-024165 | 2/1991 |
| JP | 04-154829 | 5/1992 |
| JP | 2792231 B | 7/1992 |
| JP | 3156162 B | 10/1992 |
| JP | 05039428 | 2/1993 |
| JP | 06-157754 A | 6/1994 |
| JP | 06-322251 | 11/1994 |
| JP | 07-258535 A | 10/1995 |
| JP | 08-127724 A | 5/1996 |
| JP | 09-012860 A | 1/1997 |
| JP | 09-141193 A | 6/1997 |
| JP | 09-272714 A | 10/1997 |
| JP | 11-100433 A | 4/1999 |
| JP | 11-130931 A | 5/1999 |
| JP | 2000-26791 A | 1/2000 |
| JP | 2000-119488 A | 4/2000 |
| JP | 2000109678 | 4/2000 |
| JP | 2000-136313 A | 5/2000 |
| JP | 2000-169698 A | 6/2000 |
| JP | 2000-345054 A | 12/2000 |
| JP | 2001-019842 A | 1/2001 |
| JP | 2001-072855 A | 3/2001 |

(Continued)

*Primary Examiner* — Marc Zimmer
*Assistant Examiner* — Lindsay Nelson
(74) *Attorney, Agent, or Firm* — Sughrue Mion, PLLC

(57) ABSTRACT

Provision of a curable composition having good curability and adhesiveness by the use of a non-organotin catalyst.
A curable composition containing an organic polymer (A) having a silicon-containing group crosslinkable by forming a siloxane bond, metal carboxylate (B), a silane coupling agent (C) free of an amino group, and an amino group-containing compound (D) in an amount corresponding to a weight ratio relative to (B) of 0-0.05, which contains, as the silicon-containing group of component (A), a silicon-containing group, wherein three hydrolyzable groups or hydroxyl groups are bonded to a silicon atom, as an essential component.

14 Claims, No Drawings

FOREIGN PATENT DOCUMENTS

| | | |
|---|---|---|
| JP | 2001-163918 A | 6/2001 |
| JP | 2001-172515 A | 6/2001 |
| JP | 2001181532 | 7/2001 |
| JP | 2001342363 | 12/2001 |
| JP | 2002-020458 A | 1/2002 |
| JP | 2002-155201 A | 5/2002 |
| JP | 2002-285018 A | 10/2002 |
| JP | 2003-34757 A | 2/2003 |
| JP | 2003-206410 A | 7/2003 |
| JP | 4150220 B | 7/2003 |
| JP | 2004-083606 A | 3/2004 |
| JP | 2005-8722 A | 1/2005 |
| JP | 2006-316287 A | 11/2006 |
| WO | 9948492 A1 | 9/1999 |
| WO | 00/56817 A1 | 9/2000 |
| WO | 2004/031300 A1 | 4/2004 |

\* cited by examiner

CURABLE COMPOSITION

TECHNICAL FIELD

The present invention relates to a curable composition containing an organic polymer having a hydroxyl group or hydrolyzable group bonded to a silicon atom and a silicon-containing group crosslinkable by forming a siloxane bond (hereinafter to be also referred to as a "reactive silicon group").

BACKGROUND ART

Organic polymers containing at least one reactive silicon group in a molecule are known to crosslink even at room temperature by the formation of a siloxane bond accompanying hydrolysis of the reactive silicon group due to moisture etc., and the like, to produce a rubbery cured product.

Of these polymers having a reactive silicon group, a polymer wherein the main chain skeleton is a polyoxyalkylene polymer or a polyisobutylene polymer is disclosed in patent reference 1, patent reference 2 and the like, has been industrially produced and widely used as sealing material, adhesive, paint and the like.

Curable compositions used for sealing materials, adhesives, paints and the like and rubbery cured products obtained by curing are requested to show various properties such as curability, adhesiveness, mechanical property and the like and various investigations are underway.

As a reactive silicon group, for example, a polymer having a silicon group, wherein two hydrolyzable groups are bonded per one silicon atom, affords a composition superior in elongation and flexibility. As disclosed in patent reference 3, patent reference 4 and the like, a polymer having a silicon group, wherein three hydrolyzable groups are bonded per one silicon atom, has superior curability.

Patent reference 5, patent reference 6 and patent reference 7 describe control of adhesiveness, tensile property of cured product and the like by the addition of amino group-substituted alkoxysilane.

A curable composition containing an organic polymer having a reactive silicon group is cured with a silanol condensation catalyst and, generally, organotin catalysts having a carbon-tin bond such as dibutyltinbis(acetylacetonate) and the like have been widely used. In recent years, however, the toxicity of organotin compounds has been pointed out and the development of a non-organotin catalyst is desired.

As described in patent reference 8, patent reference 9, patent reference 10, patent reference 11, patent reference 12 and patent reference 13, tin carboxylates and other metal carboxylates can also be used as a silanol condensation catalyst. These prior art references have already disclosed that curability is improved by a combined use of metal carboxylate and an amine compound.

patent reference 1: JP-A-52-73998
patent reference 2: JP-A-63-6041
patent reference 3: WO98/47939
patent reference 4: JP-A-2000-129126
patent reference 5: JP-A-2000-345054
patent reference 6: JP-A-5-117519
patent reference 7: JP-B-62-35421
patent reference 8: JP-A-55-9669
patent reference 9: JP-B-3062626
patent reference 10: JP-A-6-322251
patent reference 11: JP-A-2000-345054
patent reference 12: JP-A-2003-206410
patent reference 13: JP-A-2002-285018

DISCLOSURE OF THE INVENTION

Problems to be Solved by the Invention

However, when a curing catalyst of a curable composition containing an organic polymer having a reactive silicon group, a curing catalyst and an adhesion-imparting agent as essential components is a combination of the above-mentioned metal carboxylate and an amine compound, the curability tends to be degraded as compared to the use of an organotin compound. When a polymer having a silicon group, wherein three hydrolyzable groups are bonded per one silicon atom is used as an organic polymer, the curability is improved somewhat, but sufficient curability is difficult to achieve as compared to the use of an organotin compound.

The present invention aims at providing a curable composition comprising an organic polymer having a reactive silicon group as a main component, which achieves good curability and good adhesiveness by the use of a non-organotin catalyst.

Means of Solving the Problems

The present inventors have conducted intensive studies in an attempt to solve the above-mentioned problems and found that a curable composition having superior curability and good adhesiveness can be obtained by using an organic polymer having a silicon group, wherein three hydroxyl groups or hydrolyzable groups are bonded per one silicon atom, as an essential organic polymer having a reactive silicon group, using metal carboxylate as a silanol condensation catalyst, limiting the amount of an amino group-containing compound to be contained in the composition, and using a silane coupling agent free of an amino group as a tackifier, which resulted in the completion of the present invention.

Accordingly, the present invention relates to a curable composition comprising
(A) 100 parts by weight of an organic polymer having a silicon-containing group crosslinkable by forming a siloxane bond,
(B) 0.001-20 parts by weight of metal carboxylate,
(C) 0.01-20 parts by weight of a silane coupling agent free of an amino group, and
(D) an amino group-containing compound in an amount corresponding to a weight ratio with component (B) of 0-0.05, wherein a silicon-containing group wherein three hydrolyzable groups or hydroxyl groups are bonded to a silicon atom is contained as an essential silicon-containing group of component (A).

The organic polymer for component (A) has a number average molecular weight within the range of 500 to 100,000, has a reactive silicon group represented by the formula (1):

$$-SiR^1_{3-a}X_a \qquad (1)$$

wherein $R^1$ in the number of 3-a are each independently a substituted or unsubstituted hydrocarbon group having 1 to 20 carbon atoms, or a triorganosiloxy group represented by $(R')_3SiO-$
  wherein R' is a substituted or unsubstituted hydrocarbon group having 1 to 20 carbon atoms, and three R's may be the same or different,
X is a hydroxyl group or a hydrolyzable group, and when two or more X's are present, they may be the same or different, and
a is 1, 2 or 3, on the main chain terminal and/or side chain. Preferably, a reactive silicon group of the formula (1) wherein a is 3 is contained as an essential component, and X is more preferably an alkoxy group, particularly preferably a methoxy group.

Of the organic polymers for component (A), the proportion of an organic polymer having a silicon-containing group wherein three hydrolyzable groups or hydroxyl groups are bonded to a silicon atom is more preferably not less than 10%.

A preferable main chain skeleton of the organic polymer for component (A) is at least one kind of polymer selected from the group consisting of a polyoxyalkylene polymer, a saturated hydrocarbon polymer, and a (meth)acrylic acid ester polymer, more preferably a polyoxypropylene polymer.

The component (B) is particularly preferably divalent tin carboxylate.

As a preferable embodiment of the curable composition of the present invention, a sealing material or adhesive using any of the aforementioned curable compositions can be mentioned.

Effect of the Invention

The curable composition of the present invention contains a non-organotin catalyst but is superior in the curability and adhesiveness.

BEST MODE FOR EMBODYING THE INVENTION

The present invention is explained in detail in the following.

The main chain skeleton of the organic polymer having a reactive silicon group to be used in the present invention is not particularly limited, and organic polymers having various main chain skeletons can be used.

Specific examples include polyoxyalkylene polymers such as polyoxyethylene, polyoxypropylene, polyoxybutylene, polyoxytetramethylene, polyoxyethylene-polyoxypropylene copolymer, polyoxypropylene-polyoxybutylene copolymer and the like; hydrocarbon polymers such as ethylene-propylene copolymer, copolymer of polyisobutylene, isobutylene and isoprene etc., copolymer of polychloroprene, polyisoprene, isoprene or butadiene and acrylonitrile and/or styrene etc., copolymer of polybutadiene, isoprene or butadiene and acrylonitrile and styrene etc., hydrogenated polyolefin polymer obtained by hydrogenation of these polyolefin polymers, and the like; polyester polymers obtained by condensation of dibasic acid (e.g., adipic acid etc.) and glycol, or ring-opening polymerization of lactones; (meth)acrylic acid ester polymers obtained by radical polymerization of monomers such as ethyl (meth)acrylate, butyl (meth)acrylate and the like; vinyl polymers obtained by radical polymerization of monomers such as (meth)acrylic acid ester monomer, vinyl acetate, acrylonitrile, styrene and the like; graft polymers obtained by polymerization of vinyl monomers in the aforementioned organic polymer; polysulfide polymers; polyamide polymers such as nylon 6 obtained by ring-opening polymerization of ε-caprolactam, nylon 6,6 obtained by condensation polymerization of hexamethylenediamine and adipic acid, nylon 6,10 obtained by condensation polymerization of hexamethylenediamine and sebacic acid, nylon 11 obtained by condensation polymerization of ε-aminoundecanoic acid, nylon 12 obtained by ring-opening polymerization of ε-aminolaurolactam, copolymerized nylon of two or more components from the above-mentioned nylons and the like; polycarbonate polymers produced, for example, by condensation polymerization of bisphenol A and carbonyl chloride, diallyl phthalate polymers and the like.

Saturated hydrocarbon polymers such as polyisobutylene, hydrogenated polyisoprene, hydrogenated polybutadiene and the like, polyoxyalkylene polymer, and (meth)acrylic acid ester polymer are more preferable because they have comparatively low glass transition temperature and the obtained cured products are superior in cold resistance.

While the glass transition temperature of the organic polymer, component (A), is not particularly limited, it is preferably not more than 20° C., more preferably not more than 0° C., particularly preferably not more than −20° C. When the glass transition temperature exceeds 20° C., the viscosity becomes high in winter or cold places and workability may be degraded. In addition, the flexibility of cured products as well as elongation may be degraded. The aforementioned glass transition temperature is a value determined by DSC measurement.

Polyoxyalkylene polymer and (meth)acrylic acid ester polymer are particularly preferable because they have high moisture permeability and, when they are processed into a one-component composition, they are superior in good curing depth and more superior in adhesiveness, and polyoxyalkylene polymer is most preferable.

The reactive silicon group contained in an organic polymer having a reactive silicon group has a hydroxyl group or hydrolyzable group bonded to a silicon atom, and can be crosslinked by forming a siloxane bond by a reaction with a silanol condensation catalyst. As the reactive silicon group, a group represented by the formula (2):

$$-(SiR^2{}_{2-c}X_cO)_m-SiR^1{}_{3-b}X_b \qquad (2)$$

wherein $R^1$ and $R^2$ are each independently a substituted or unsubstituted hydrocarbon group having 1 to 20 carbon atoms, or a triorganosiloxy group represented by $(R')_3SiO-$
wherein R' is a substituted or unsubstituted hydrocarbon group having 1 to 20 carbon atoms, and three R's may be the same or different,
each X is independently a hydroxyl group or a hydrolyzable group,
b is any of 0, 1, 2 and 3, c is any of 0, 1 and 2, a combination of b is 0 and c is 0 is excluded, and m is an integer of 0 or 1-19, can be mentioned.

The hydrolyzable group is not particularly limited and a conventional known hydrolyzable group can be used. Specifically, for example, hydrogen atom, halogen atom, alkoxy group, acyloxy group, ketoxymate group, amino group, amide group, acid amide group, aminooxy group, mercapto group, alkenyloxy group and the like can be mentioned. Of these, hydrogen atom, alkoxy group, acyloxy group, ketoxymate group, amino group, amide group, aminooxy group, mercapto group and alkenyloxy group are preferable, and an alkoxy group is particularly preferable from the viewpoint that hydrolysis proceeds mildly and handling is easy.

Hydrolyzable group and hydroxyl group can be bonded to silicon atom at a range of 1 to 3 groups per one silicon atom and (b+Σc) is preferably within the range of 1 to 5. When two or more hydrolyzable groups and hydroxyl groups are bonded to a reactive silicon group, they may be the same or different.

While not less than one silicon atoms form a reactive silicon group, when the silicon atom is bonded by a siloxane bond and the like, the number of silicon atoms is preferably not more than 20.

Particularly, a reactive silicon group represented by the formula (1):

$$-SiR^1{}_{3-a}X_a \qquad (1)$$

wherein $R^1$ and X are as defined above and
a is 1, 2 or 3.
is preferable because it is easily available.

Specific examples of $R^1$ and $R^2$ of the above-mentioned formulas (1) and (2) include, for example, alkyl groups such as methyl group, ethyl group and the like, cycloalkyl groups such as cyclohexyl group and the like, aryl groups such as phenyl group and the like, aralkyl groups such as benzyl group and the like, a triorganosiloxy group represented by $(R')_3SiO$— wherein R' is methyl group, phenyl group etc. and the like. Of these, methyl group is particularly preferable.

More specific examples of the reactive silicon group include trimethoxysilyl group, triethoxysilyl group, triisopropoxysilyl group, dimethoxymethylsilyl group, diethoxymethylsilyl group and diisopropoxymethylsilyl group. Since high activity and good curability can be obtained, trimethoxysilyl group, triethoxysilyl group and dimethoxymethylsilyl group are more preferable, and trimethoxysilyl group is particularly preferable. From the viewpoint of storage stability, dimethoxymethylsilyl group is particularly preferable.

It is essential that the curable composition of the present invention contain an organic polymer having a reactive silicon group, which has three hydrolyzable groups on a silicon atom, such as trimethoxysilyl group, triethoxysilyl group, triisopropoxysilyl group and the like. A curable composition having superior curability and good adhesiveness can be obtained by using metal carboxylate (B) as a catalyst, limiting an adhesion-imparting agent as component (C), and reducing the amount of an amino group-containing compound (D) contained in the composition. Of these, trimethoxysilyl group is preferable because it shows particularly superior curability.

In addition, the organic polymer having a reactive silicon group having three hydrolyzable groups on the silicon atom tends to afford a curable composition showing good recovery property, good durability and good creep resistance. Triethoxysilyl group is particularly preferable because alcohol produced by hydrolysis of a reactive silicon group is ethanol and has high safety.

While the proportion of the organic polymer having a reactive silicon group having three hydrolyzable groups on the silicon atom in the organic polymer (A) used in the present invention can be any, to obtain a curable composition satisfying the rapid curability, it is preferably not less than 10%, more preferably not less than 20%.

The reactive silicon group can be introduced by a known method. For example, the following method can be used.

(i) An organic polymer having a functional group such as hydroxyl group and the like in a molecule is reacted with an active group reactive with this functional group and an organic compound having an unsaturated group to give an organic polymer containing an unsaturated group. Alternatively, an unsaturated group-containing organic polymer can be obtained by copolymerization with unsaturated group-containing epoxy compound. Then, the obtained reaction product reacted with hydrosilane having a reactive silicon group for hydrosilylation.

(ii) An organic polymer containing an unsaturated group obtained in the same manner as in method (i) is reacted with a compound having a mercapto group and a reactive silicon group.

(iii) an organic polymer having a functional group having hydroxyl group, epoxy group, isocyanate group and the like in a molecule is reacted with a compound having a functional group reactive with the above functional group and a reactive silicon group.

Of the above methods, method (i) and method (iii) wherein a polymer having a hydroxyl group at the terminal is reacted with a compound having an isocyanate group and a reactive silicon group are preferable since a high conversion ratio is obtained in comparatively a short reaction time. Moreover, since an organic polymer having a reactive silicon group obtained by method (i) affords a curable composition having good workability at a low viscosity than does an organic polymer obtained by method (iii), and an organic polymer obtained by method (ii) has a strong odor based on mercaptosilane, method (i) is particularly preferable.

Specific examples of hydrosilane compound used in method (i) include, but not limited to, halogenated silanes such as trichlorosilane, methyldichlorosilane, dimethylchlorosilane and phenyldichlorosilane; alkoxysilanes such as trimethoxysilane, triethoxysilane, methyldiethoxysilane, methyldimethoxysilane and phenyldimethoxysilane; acyloxysilanes such as methyldiacetoxysilane and phenyldiacetoxysilane; ketoxymatesilanes such as bis(dimethylketoxymate)methylsilane and bis(cyclohexylketoxymate)methylsilane and the like. Of these, halogenated silanes and alkoxysilanes are preferable, and particularly, alkoxysilanes are most preferable since hydrolysis of the obtained curable composition proceeds mildly and handling thereof is easy. Of the alkoxysilanes, methyldimethoxysilane is particularly preferable since it is easy to obtain, and a curable composition containing the obtained organic polymer is high in the curability, storage stability, elongation property and tensile strength.

Of the above-mentioned hydrosilane compounds, a hydrosilane compound represented by the formula (3):

$$H—SiX_3 \qquad (3)$$

wherein X is as defined above, is preferable since a curable composition composed of an organic polymer obtained by the addition reaction of the hydrosilane compound shows superior curability. Of the hydrosilane compounds represented by the formula (3), trialkoxysilanes such as trimethoxysilane, triethoxysilane, triisopropoxysilane and the like are more preferable.

Of the aforementioned trialkoxysilanes, trialkoxysilane containing an alkoxy group (methoxy group) having one carbon atom, such as trimethoxysilane and the like, may cause rapid progress of a disproportionation reaction and when the disproportionation reaction proceeds, a considerably dangerous compound such as dimethoxysilane is produced. From the viewpoint of handling safety, trialkoxysilane containing an alkoxy group having not less than 2 carbon atoms, which is represented by the formula (4):

$$H—Si(OR^3)_3 \qquad (4)$$

wherein each of three $R^3$ is independently a monovalent organic group having 2 to 20 carbon atoms, is preferably used. From the viewpoint of availability and handling safety, triethoxysilane is most preferable.

Examples of the synthetic method (ii) include, but are not limited to, a method comprising introducing a compound having a mercapto group and a reactive silicon group into an unsaturated bond moiety of an organic polymer by a radical addition reaction in the presence of a radical initiator and/or a radical source and the like. Specific examples of the compound having the aforementioned mercapto group and reactive silicon group include, but are not limited to, γ-mercaptopropyltrimethoxysilane, γ-mercaptopropylmethyldimethoxysilane, γ-mercaptopropyltriethoxysilane, γ-mercaptopropylmethyldiethoxysilane, mercaptomethyltrimethoxysilane, mercaptomethyltriethoxysilane and the like.

Of the synthetic methods (iii), examples of the method wherein a polymer having a hydroxyl group at the terminal is reacted with a compound having an isocyanate group and a reactive silicon group include, but are not limited to, a method shown in JP-A-3-47825 and the like. Specific examples of the aforementioned compound having an isocyanate group and a reactive silicon group include, but are not limited to, γ-isocyanatepropyltrimethoxysilane, γ-isocyanatepropylmethyldimethoxysilane, γ-isocyanatepropyltriethoxysilane, γ-isocyanatepropylmethyldiethoxysilane, isocyanatemethyltrimethoxysilane, isocyanatemethyltriethoxysilane, isocyanatemethyldimethoxymethylsilane, isocyanatemethyldiethoxymethylsilane and the like.

As mentioned above, a silane compound wherein three hydrolyzable groups are bonded to one silicon atom, such as trimethoxysilane and the like, may permit a disproportionation reaction to proceed. When the disproportionation reaction proceeds, a considerably dangerous compound such as dimethoxysilane is produced. However, such a disproportionation reaction does not proceed in the case of γ-mercaptopropyltrimethoxysilane and γ-isocyanatepropyltrimethoxysilane. Therefore, when a group wherein three hydrolyzable groups are bonded to one silicon atom such as trimethoxysilyl group and the like is used as a silicon-containing group, the synthetic method of (ii) or (iii) is preferably used.

An organic polymer having a reactive silicon group may be linear or branched and its number average molecular weight is about 500-100,000, more preferably 1,000-50,000, particularly preferably 3,000-30,000, based on the polystyrene by GPC. When the number average molecular weight is less than 500, the cured product tends to show inconvenient elongation, and when it exceeds 100,000, high viscosity tends to cause inconvenient workability.

To obtain a rubbery cured product having high strength, high elongation and low elastic modulus, the reactive silicon group contained in an organic polymer has at least one, preferably 1.1-5 groups, on average in one molecule of a polymer. When the number of the reactive silicon group contained in a molecule is less than 1 on average, the curability becomes insufficient and good rubber elasticity behavior is difficult to express. The reactive silicon group may be present at the terminal of the main chain of the organic polymer molecular chain or at the terminal of a side chain. Particularly, when the reactive silicon group is present only at the terminal of the main chain of the molecular chain, the effective network length of the organic polymer contained in the component cured product finally formed becomes long, and a rubbery cured product showing high strength, high elongation and low elastic modulus can be obtained easily.

The aforementioned polyoxyalkylene polymer is essentially preferably a polymer having a repeat unit of the formula (5):

$$—R^4—O—\quad(5)$$

wherein $R^4$ is a linear or branched alkylene group having 1 to 14 carbon atoms and $R^4$ is a linear or branched alkylene group having 1 to 14, more preferably 2 to 4, carbon atoms. Specific examples of the repeat unit shown by the formula (5) include

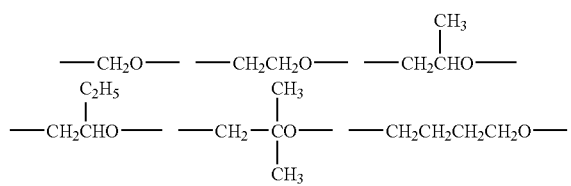

and the like. The main chain skeleton of the polyoxyalkylene polymer may consist of only one kind of repeat unit or two or more kinds of repeat units. Particularly, when used as a sealant and the like, a polymer comprising a propyleneoxide polymer as a main component is preferable because it is amorphous and comparatively low in viscosity.

Examples of the synthetic method of a polyoxyalkylene polymer include, but are not limited to, a polymerization method using an alkali catalyst such as KOH, a polymerization method using a transition metal compound-porphyrin complex catalyst such as a complex obtained by reacting an organic aluminum compound and porphyrin as shown in JP-A-61-215623, a polymerization method using a double-metal cyanide complex catalyst as shown in JP-B-46-27250, JP-B-59-15336, U.S. Pat. No. 3,278,457; U.S. Pat. No. 3,278,458, U.S. Pat. No. 3,278,459, U.S. Pat. No. 3,427,256, U.S. Pat. No. 3,427,334, U.S. Pat. No. 3,427,335 and the like, a polymerization method using a catalyst comprising a polyphosphagen salt shown in JP-A-10-273512, a polymerization method using a catalyst comprising a phosphagen compound shown in JP-A-11-060722 and the like.

Examples of the production method of a polyoxyalkylene polymer having a reactive silicon group include, but are not limited to, those disclosed in JP-B-45-36319, JP-B-46-12154, JP-A-50-156599, JP-A-54-6096, JP-A-55-13767, JP-A-55-13468, JP-A-57-164123, JP-B-3-2450, U.S. Pat. No. 3,632,557, U.S. Pat. No. 4,345,053, U.S. Pat. No. 4,366,307, U.S. Pat. No. 4,960,844 and the like, polyoxyalkylene polymers having a number average molecular weight of not less than 6,000, Mw/Mn of 1.6 or below and narrow molecular weight distribution, such as those disclosed in JP-A-61-197631, JP-A-61-215622, JP-A-61-215623, JP-A-61-218632, JP-A-3-72527, JP-A-3-47825 and JP-A-8-231707.

The above-mentioned polyoxyalkylene polymer having a reactive silicon group may be used alone, or two or more kinds thereof may be used in combination.

The aforementioned saturated hydrocarbon polymer is substantially free of a carbon-carbon unsaturated bond other than the aromatic ring, and the polymer constituting the skeleton can be obtained by (1) polymerization of olefin compound having 2 to 6 carbon atoms such as ethylene, propylene, 1-butene, isobutylene and the like as a main monomer, (2) homopolymerization of diene compound such as butadiene, isoprene and the like, or copolymerization of the above-mentioned olefin compound, and then hydrogenation thereof and the like. Isobutylene polymer and hydrogenated polybutadiene polymer are preferable because a functional group can be easily introduced into the terminal, the molecular weight can be controlled easily and the number of the terminal functional group can be increased, and isobutylene polymer is particularly preferable.

Polymers having a saturated hydrocarbon polymer as the main chain skeleton are characteristically superior in the heat resistance, weather resistance, durability, and moisture barrier property.

Isobutylene polymer may have a monomer unit all consisting of an isobutylene unit, or a copolymer with other monomer. From the viewpoint of rubber property, one containing not less than 50 wt % of a repeat unit derived from isobutylene is preferable, one containing not less than 80 wt % thereof is more preferable, and one containing 90-99 wt % thereof is particularly preferable.

While various polymerization methods have been conventionally reported as synthetic methods of saturated hydrocarbon polymer, many methods of what is called living polymerization have been particularly developed in recent years. A saturated hydrocarbon polymer, particularly an isobutylene polymer, can be easily produced by inifer polymerization found by Kennedy et al. (J. P. Kennedy et al., J. Polymer Sci., Polymer Chem. Ed. 1997, vol. 15, p. 2843). It is known that a polymer having a molecular weight of about 500-100,000 can be polymerized at a molecular weight distribution of not more than 1.5, and various functional groups can be introduced into the molecule terminal.

While the production methods of saturated hydrocarbon polymer having a reactive silicon group are described, but not limited to, for example, in JP-B-4-69659, JP-B-7-108928, JP-A-63-254149, JP-A-64-22904, JP-A-1-197509, JP-B-2539445, JP-B-2873395, JP-A-7-53882 and the like.

The above-mentioned saturated hydrocarbon polymer having a reactive silicon group may be used alone, or two or more kinds thereof may be used in combination.

The (meth)acrylic acid ester monomer constituting the main chain of the aforementioned (meth)acrylic acid ester polymer is not particularly limited, and various kinds thereof can be used. Examples thereof include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluoyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth) acrylate, stearyl (meth)acrylate, glycidyl (meth)acrylate, 2-aminoethyl (meth)acrylate, γ-(methacryloyloxypropyl)trimethoxysilane, γ-(methacryloyloxypropyl)dimethoxymethylsilane, methacryloyloxymethyltrimethoxysilane, methacryloyloxymethyldimethoxymethylsilane, ethyleneoxide adduct of (meth)acrylic acid, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, perfluoroethyl (meth)acrylate, trifluoromethyl (meth)acrylate, bis(trifluoromethylmethyl) (meth)acrylate, 2-trifluoromethyl-2-perfluoroethylethyl (meth)acrylate, 2-perfluorohexylethyl (meth)acrylate, 2-perfluorodecylethyl (meth)acrylate, 2-perfluorohexadecylethyl (meth)acrylate and the like (meth)acrylic acid monomer. For the aforementioned (meth)acrylic acid ester polymer, the following vinyl monomers can be copolymerized with the (meth)acrylic acid ester monomer. Examples of the vinyl monomer include styrene monomers such as styrene, vinyltoluene, α-methylstyrene, chlorostyrene, styrenesulfonic acid, a salt thereof and the like; fluorine-containing vinyl monomers such as p-fluoroethylene, perfluoropropylene, vinylidene fluoride and the like; silicon-containing vinyl monomers such as vinyltrimethoxysilane, vinyltriethoxysilane and the like; maleic anhydride, maleic acid, maleic acid monoalkylester and dialkylester; fumaric acid, fumaric acid monoalkylester and dialkylester; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, cyclohexylmaleimide and the like; nitrile group-containing vinyl monomers such as acrylonitrile, methacrylonitrile and the like; amide group-containing vinyl monomers such as acrylamide, methacrylamide and the like; vinyl esters such as vinyl acetate, vinyl propionate, vinyl pivalate, vinyl benzoate, vinyl cinnamate and the like; alkenes such as ethylene, propylene and the like; conjugated dienes such as butadiene, isoprene and the like; vinyl chloride, vinylidene chloride, allyl chloride, allyl alcohol and the like. They may be used alone, or plural kinds thereof may be copolymerized. Of these, a polymer made of a styrene monomer and a (meth)acrylic acid monomer is preferable, in view of the property of the resultant product and the like. A (meth)acrylic polymer made of an acrylic acid ester monomer and a methacrylic acid ester monomer is more preferable, and an acrylic polymer made of an acrylic acid ester monomer is particularly preferable. Since low viscosity of the added components, properties of a cured product such as low modulus, high elongation, weather resistance, heat resistance and the like are requested for use in general construction and the like, butyl acrylate monomers are more preferable. In contrast, for use requesting oil resistance and the like such as automobile and the like, copolymers mainly containing ethyl acrylate are more preferable. The polymers mainly containing ethyl acrylate tend to be superior in oil resistance and somewhat inferior in low temperature property (cold resistance). Thus, it is also possible to replace a part of ethyl acrylate with butyl acrylate so as to improve its low temperature property. However, since an increased ratio of butyl acrylate is associated with degradation of its good oil resistance, the ratio is preferably not more than 40%, more preferably not more than 30%, for use requesting oil resistance. It is also preferable to use 2-methoxyethyl acrylate or 2-ethoxyethyl acrylate and the like wherein oxygen is introduced into the side chain alkyl group, to improve the low temperature property and the like without impairing oil resistance. However, since heat resistance tends to become inferior by the introduction of an alkoxy group having an ether bond into the side chain, when heat resistance is requested, the ratio thereof is preferably not more than 40%. It is possible to consider requested properties such as oil resistance and heat resistance, low temperature property and the like and change the ratio depending on various uses and desired objects, thereby providing a suitable polymer. For example, an exemplary copolymer superior in the balance of properties such as oil resistance, heat resistance, low temperature property and the like is, without limitation, ethyl acrylate/butyl acrylate/2-methoxyethyl acrylate (weight ratio of 40-50/20-30/30-20). In the present invention, such preferable monomer may be copolymerized, or further block copolymerized, with other monomer. In that case, such preferable monomer is preferably contained in a weight ratio of not less than 40%. In the above-mentioned expressions, for example, (meth)acrylic acid means acrylic acid and/or methacrylic acid.

The synthetic method of the (meth)acrylic acid ester polymer is not particularly limited and a known method can be used. However, use of azo compound, peroxide and the like as a polymerization initiator causes a problem in that the polymer obtained by a general free radical polymerization method shows a wide molecular weight distribution of usually not less than 2, and high viscosity. Accordingly, to obtain a (meth)acrylic acid ester polymer having a narrow molecular weight distribution and low viscosity, as well as a crosslinkable functional group in the molecular chain terminal at a high ratio, a living radical polymerization method is preferably used.

Of the "living radical polymerization methods", the "atom transfer radical polymerization method" comprising polymerizing (meth)acrylic acid ester monomer using an organic halide or halogenated sulfonyl compound and the like as an initiator and a transition metal complex as a catalyst is more preferable as a production method of (meth)acrylic acid ester polymer having a particular functional group since it has, in addition to the characteristics of the above-mentioned "living radical polymerization method", a great degree of freedom in the design of initiator and catalyst because the monomer has, at the terminal, halogen and the like comparatively advantageous for a functional group conversion reaction. As the atom transfer radical polymerization method, for example, Matyjaszewski et al., Journal of American Chemical Society (J. Am. Chem. Soc.), 1995, vol. 117, p. 5614 and the like can be mentioned.

As the production method of the (meth)acrylic acid ester polymer having a reactive silicon group, for example, JP-B-3-14068, JP-B-4-55444, JP-A-6-211922 and the like disclose production methods based on a free radical polymerization method using a chain transfer agent. In addition, JP-A-9-272714 and the like disclose production methods using an atom transfer radical polymerization method, but the method is not particularly limited to them.

The above-mentioned (meth)acrylic acid ester polymer having a reactive silicon group may be used alone, or two or more kinds thereof may be used in combination.

The organic polymer having a reactive silicon group may be used alone, or two or more kinds thereof may be used in combination. Specifically, an organic polymer which is a blend of two or more kinds selected from the group consisting of a polyoxyalkylene polymer having a reactive silicon group, a saturated hydrocarbon polymer having a reactive silicon group, and a (meth)acrylic acid ester polymer having a reactive silicon group can also be used.

The production methods of an organic polymer which is a blend of a polyoxyalkylene polymer having a reactive silicon group and a (meth)acrylic acid ester polymer having a reactive silicon group are proposed in JP-A-59-122541, JP-A-63-112642, JP-A-6-172631, JP-A-11-116763 and the like, but the method is not particularly limited to them. Specific example of preferable production method comprises blending a copolymer of a (meth)acrylic acid ester monomer unit having a reactive silicon group, wherein a molecular chain substantially has an alkyl group having 1 to 8 carbon atoms, which is represented by the following formula (6):

$$-CH_2-C(R^5)(COOR^6)- \quad (6)$$

wherein $R^5$ is a hydrogen atom or a methyl group, and $R^6$ is an alkyl group having 1 to 8 carbon atoms, and a (meth)acrylic acid ester monomer unit having an alkyl group having not less than 10 carbon atoms, which is represented by the following formula (7):

$$-CH_2-C(R^5)(COOR^7)- \quad (7)$$

wherein $R^5$ is as defined above, and $R^7$ is an alkyl group having not less than 10 carbon atoms, with a polyoxyalkylene polymer having a reactive silicon group.

As $R^6$ in the aforementioned formula (6), for example, alkyl group having 1 to 8, preferably 1 to 4, more preferably 1 or 2, carbon atoms, such as methyl group, ethyl group, propyl group, n-butyl group, t-butyl group, 2-ethylhexyl group and the like can be used. The alkyl group for $R^6$ may be used alone, or two or more kinds thereof may be used in combination.

As $R^7$ in the aforementioned formula (7), for example, a long chain alkyl group having not less than 10, generally 10 to 30, preferably 10 to 20, carbon atoms, such as lauryl group, tridecyl group, cetyl group, stearyl group, behenyl group and the like can be used. As in the case of $R^6$, the alkyl group for $R^7$ may be used alone, or two or more kinds thereof may be used in combination.

The molecular chain of the (meth)acrylic acid ester copolymer substantially consists of the monomer units of the formula (6) and the formula (7), wherein "substantially" here means that the total of the monomer units of the formula (6) and the formula (7) present in the copolymer exceeds 50 wt %. The total of the monomer units of the formula (6) and the formula (7) is preferably not less than 70 wt %.

The weight ratio of the monomer unit of the formula (6) and that of the formula (7) is preferably 95:5-40:60, more preferably 90:10-60:40.

Examples of the monomer unit that may be contained in the copolymer, which is other than the monomer units of the formula (6) and the formula (7) include acrylic acids such as acrylic acid, methacrylic acid and the like; monomers containing an amino group such as amide groups such as acrylamide, methacrylamide, N-methylolacrylamide, N-methylolmethacrylamide and the like, epoxy groups such as glycidyl acrylate, glycidyl methacrylate and the like, diethylaminoethylacrylate, diethylaminoethylmethacrylate, aminoethylvinylether and the like; and other monomer units derived from acrylonitrile, styrene, α-methylstyrene, alkylvinylether, vinyl chloride, vinyl acetate, vinyl propionate, ethylene and the like.

The organic polymer obtained by blending a saturated hydrocarbon polymer having a reactive silicon group and a (meth)acrylic acid ester copolymer having a reactive silicon group is proposed in JP-A-1-168764, JP-A-2000-186176 and the like, but the method is not particularly limited thereto.

As a production method of the organic polymer of the blend of a (meth)acrylic acid ester copolymer having a reactive silicon functional group, a method comprising polymerization of a (meth)acrylic acid ester monomer in the presence of an organic polymer having a reactive silicon group can also be used. While this production method is specifically disclosed in JP-A-59-78223, JP-A-59-168014, JP-A-60-228516, JP-A-60-228517 and the like, but the method is not particularly limited thereto.

In addition, other components such as urethane bond component and the like may also be contained in the main chain skeleton of the organic polymer as long as the effect of the invention is not greatly impaired.

While the aforementioned urethane bond component is not particularly limited, a group produced by the reaction of an isocyanate group with an active hydrogen group (hereinafter to be also referred to as an amide segment) can be mentioned.

The aforementioned amide segment is a group represented by the formula (8):

$$-NR^8-C(=O)- \quad (8)$$

wherein $R^8$ is a hydrogen atom or a substituted or unsubstituted organic group.

As the aforementioned amide segment, specifically, a urethane group produced by the reaction of an isocyanate group and a hydroxyl group; a urea group produced by the reaction of an isocyanate group and an amino group; a thiourethane group produced by the reaction of an isocyanate group and a mercapto group and the like can be mentioned. In the present invention, the above-mentioned urethane group, urea group and an active hydrogen in the thiourethane group, and further a group produced by the reaction with an isocyanate group are also included in the group of the formula (8).

Examples of the industrially easy production method of an amide segment and an organic polymer having a reactive silicon group include a method comprising reacting an organic polymer having an active hydrogen-containing group at the terminal with an excess polyisocyanate compound to give a polymer having an isocyanate group at the terminal of the polyurethane main chain, or simultaneously reacting the whole or part of the isocyanate group with the Z group of a silicon compound represented by the formula (9):

$$Z-R^9-SiR^1_{3-a}X_a \quad (9)$$

Wherein $R^1$, X and a are as defined above,
$R^9$ is a divalent organic group, more preferably a substituted or unsubstituted divalent hydrocarbon group having 1 to 20 carbon atoms, and
Z is an active hydrogen-containing group selected from a hydroxyl group, a carboxyl group, a mercapto group, and an unsubstituted or monosubstituted amino group. Known production methods of an organic polymer relating to this production method include JP-B-46-12154 (U.S. Pat. No. 3,632, 557), JP-A-58-109529 (U.S. Pat. No. 4,374,237), JP-A-62-13430 (U.S. Pat. No. 4,645,816), JP-A-8-53528 (EP0676403), JP-A-10-204144 (EP0831108), JP-A-2003-508561 (U.S. Pat. No. 6,197,912), JP-A-6-211879 (U.S. Pat. No. 5,364,955), JP-A-10-53637 (U.S. Pat. No. 5,756,751), JP-A-11-100427, JP-A-2000-169544, JP-A-2000-169545, JP-A-2002-212415, JP-B-3313360, U.S. Pat. No. 4,067,844, U.S. Pat. No. 3,711,445, JP-A-2001-323040 and the like.

In addition, one produced by reacting an organic polymer having an active hydrogen-containing group at the terminal with a reactive silicon group-containing isocyanate compound shown by the formula (10)

$$O=C=N-R^9-SiR^1{}_{3-a}X_a \quad (10)$$

wherein $R^1$, $R^9$, X and a are as defined above, can be mentioned. Known production methods of an organic polymer relating to this production method include JP-A-11-279249 (U.S. Pat. No. 5,990,257), JP-A-2000-119365 (U.S. Pat. No. 6,046,270), JP-A-58-29818 (U.S. Pat. No. 4,345,053), JP-A-3-47825 (U.S. Pat. No. 5,068,304), JP-A-11-60724, JP-A-2002-155145, JP-A-2002-249538, WO03/018658, WO03/059981 and the like.

Examples of the organic polymer having an active hydrogen-containing group at the terminal include an oxyalkylene polymer having a hydroxyl group at the terminal (polyetherpolyol), polyacrylpolyol, polyester polyol, a saturated hydrocarbon polymer having a hydroxyl group at the terminal (polyolefinpolyol), a polythiol compound, a polyamine compound, polyalkyleneimine and the like. Of these, polyetherpolyol, polyacrylpolyol and polyolefinpolyol are preferable because the glass transition temperature of the obtained organic polymer is comparatively low and the obtained cured product is superior in the cold resistance. Particularly, polyetherpolyol is particularly preferable because the obtained organic polymer has a low viscosity, fine workability and good curing depth. Moreover, polyacrylpolyol and saturated hydrocarbon polymer are more preferable because the obtained organic polymer shows good weather resistance and good heat resistance of a cured product.

As polyetherpolyol, any polyetherpolyol produced by any production method can be used. A polyetherpolyol having at least 0.7 hydroxyl group on a whole molecule average per a molecule terminal at the terminal is preferable. Specifically, an oxyalkylene polymer produced using a conventional alkali metal catalyst, an oxyalkylene polymer produced by reacting an initiator such as a polyhydroxy compound having at least two hydroxyl groups and the like with alkyleneoxide in the presence of a double metal cyanide complex or cesium, and the like can be mentioned.

Of the above-mentioned polymerization methods, a polymerization method using a double metal cyanide complex is preferable because an oxyalkylene polymer having a lower unsaturation degree, a narrow Mw/Mn, a lower viscosity, high acid resistance and high weather resistance can be obtained.

As the aforementioned polyacrylpolyol, a polyol having a (meth)acrylic acid alkylester (co)polymer as the skeleton and a hydroxyl group in a molecule can be mentioned. As the synthetic method of the polymer, a living radical polymerization method is preferable, and an atom transfer radical polymerization method is more preferable, because the molecular weight distribution can be narrowed and low viscosity can be achieved. In addition, a polymer obtained by continuous bulk polymerization of an acrylic acid alkylester monomer described in JP-A-2001-207157 at a high temperature and high pressure, i.e., SGO process, is preferably used. Specifically, UH-2000 manufactured by Toagosei Co., Ltd. and the like can be mentioned.

Specific examples of the aforementioned polyisocyanate compound include aromatic polyisocyanates such as toluene (tolylene) diisocyanate, diphenylmethane diisocyanate, xylylene diisocyanate and the like; aliphatic polyisocyanates such as isophorone diisocyanate, hexamethylene diisocyanate and the like; and the like can be mentioned.

While the silicon compound of the formula (9) is not particularly limited, specific examples thereof include amino group-containing silanes such as γ-aminopropyltrimethoxysilane, N-(β-aminoethyl)-γ-aminopropyltrimethoxysilane, γ-(N-phenyl)aminopropyltrimethoxysilane, N-ethylaminoisobutyltrimethoxysilane, N-cyclohexylaminomethyltriethoxysilane, N-cyclohexylaminomethyldiethoxymethylsilane, N-phenylaminomethyltrimethoxysilane, and the like; hydroxy group-containing silanes such as γ-hydroxypropyltrimethoxysilane and the like; mercapto group-containing silanes such as γ-mercaptopropyltrimethoxysilane and the like; and the like. Moreover, as described in JP-A-6-211879 (U.S. Pat. No. 5,364,955), JP-A-10-53637 (U.S. Pat. No. 5,756,751), JP-A-10-204144 (EP0831108), JP-A-2000-169544 and JP-A-2000-169545, Michael addition reaction product of various α,β-unsaturated carbonyl compounds and amino group-containing silane, and a Michael addition reaction product of various (meth)acryloyl group-containing silanes and an amino group-containing compound can also be used as the silicon compound of the formula (9).

While the reactive silicon group-containing isocyanate compound of the formula (10) is not particularly limited, specific examples thereof include γ-trimethoxysilylpropyl isocyanate, γ-triethoxysilylpropyl isocyanate, γ-methyldimethoxysilylpropyl isocyanate, γ-methyldiethoxysilylpropyl isocyanate, trimethoxysilylmethyl isocyanate, triethoxymethylsilylmethyl isocyanate, dimethoxymethylsilylmethyl isocyanate, diethoxymethylsilylmethyl isocyanate and the like. As described in JP-A-2000-119365 (U.S. Pat. No. 6,046,270), a compound obtained by reacting a silicon compound of the formula (9) and an excess aforementioned polyisocyanate compound can also be used as the reactive silicon group-containing isocyanate compound of the formula (10).

When an organic polymer which is component (A) of the present invention has a large amount of an amide segment in the main chain skeleton, the viscosity of the organic polymer becomes high and a composition having poor workability may be produced. On the other hand, the amide segment in the main chain skeleton of component (A) tends to increase the curability of the composition of the present invention. Accordingly, when an amide segment is contained in the main chain skeleton of component (A), the number of the amide segment is preferably 1-10, more preferably 1.5-7, particularly preferably 2-5, on average per one molecule. When it is smaller than 1, the curability may not be sufficient, and when it is greater than 10, the organic polymer may show high viscosity and a composition having poor workability may be produced.

In the present invention, a metal carboxylate is used as component (B). Component (B) of the present invention functions as what is called a silanol condensation catalyst capable of forming a siloxane bond from a hydroxyl group or hydrolyzable group bonded to a silicon atom contained in the organic polymer for component (A).

Metal carboxylate (B) is preferable as a non-organotin catalyst since it places a small burden on the environment. As compared with the use of other silanol condensation catalysts, the recovery property, durability and creep resistance of the obtained cured product can be enhanced.

As the metal carboxylate (B), tin carboxylate, lead carboxylate, bismuth carboxylate, potassium carboxylate, calcium carboxylate, barium carboxylate, titanium carboxylate, zirconium carboxylate, hafnium carboxylate, vanadium carboxylate, manganese carboxylate, iron carboxylate, cobalt carboxylate, nickel carboxylate and cerium carboxylate are preferable because catalyst activity is high, tin carboxylate, lead carboxylate, bismuth carboxylate, titanium carboxylate, iron carboxylate and zirconium carboxylate are more preferable, tin carboxylate is particularly preferable and divalent tin carboxylate is most preferable. Tin carboxylate is also preferable from the viewpoint of adhesiveness. In the present invention, dibutyltin dilaurate, dibutyltin diacetate and the like are classified into the organotin compound, and are not included in metal carboxylate (B).

Specific examples of carboxylic acid having an acid group for metal carboxylate (B) include straight chain saturated fatty acids such as acetic acid, propionic acid, butyric acid, valeric acid, caproic acid, enanthic acid, caprylic acid, 2-ethylhexanoic acid, pelargric acid; capric acid, undecanoic acid, lauric acid, tridecyl acid, myristic acid, pentadecyl acid, palmitic acid, heptadecyl acid, stearic acid, nonadecanoic acid, archidic acid, behenic acid, lignoceric acid, cerotic acid, montanic acid, melissic acid, lacceric acid and the like; monoene unsaturated fatty acids such as undecylenoic acid, linder acid, tudu acid, fiseterinic acid, myristoleic acid, 2-hexadecenoic acid, 6-hexadecenoic acid, 7-hexadecenoic acid, pulmitoleic acid, petroselinic acid, oleic acid, elaidic acid, asclepinic acid, vaccenic acid, gadoleic acid, gondoic acid, cetoleic acid, erucic acid, brassidic acid, selacholeic acid, xymenic acid, lumequeic acid, acrylic acid, methacrylic acid, angelic acid, crotonic acid, isocrotonic acid, 10-undecenoic acid and the like; polyene unsaturated fatty acids such as linoelaidic acid, linoleic acid, 10,12-octadecadienoic acid, hiragoic acid, α-eleostearic acid, β-eleostearic acid, punicic acid, linolenic acid, 8,11,14-eicosatrienoic acid, 7,10,13-docosatrienoic acid, 4,8,11,14-hexadecatetraenoic acid, moroctic acid, stearidonic acid, arachidonic acid, 8,12,16,19-docosatetraenoic acid, 4,8,12,15,18-eicosapentanoic acid, clupanodonic acid, herring acid, docosahexaenoic acid and the like; branched fatty acids such as 1-methylbutyric acid, isobutyric acid, 2-ethylbutyric acid, isovaleric acid, tuberculostearic acid, pivalic acid, 2,2-dimethylbutyric acid, 2-ethyl-2-methylbutyric acid, 2,2-diethylbutyric acid, 2,2-dimethylvaleric acid, 2-ethyl-2-methylvaleric acid, 2,2-diethylvaleric acid, 2,2-dimethylhexanoic acid, 2,2-diethylhexanoic acid, 2,2-dimethyloctanoic acid, 2-ethyl-2,5-dimethylhexanoic acid, neodecanoic acid, versatic acid and the like; fatty acid having a triple bond such as propiolic acid, tariric acid, stearoric acid, crepenynic acid, xymenynic acid, 7-hexadecynic acid and the like; alicyclic carboxylic acids such as naphthenic acid, malvalinic acid, sterculic acid, hydnocarpic acid, chaulmoogric acid, gorlic acid, 1-methylcyclopentanecarboxylic acid, 1-methylcyclohexanecarboxylic acid, 2-methylbicyclo[2.2.1]-5-heptene-2-carboxylic acid, 1-adamantanecarboxylic acid, bicyclo[2.2.1]heptane-1-carboxylic acid, bicyclo[2.2.2]octane-1-carboxylic acid and the like; oxygen-containing fatty acids such as acetoacetic acid, ethoxyacetic acid, glyoxylic acid, glycolic acid, gluconic acid, sabinic acid, 2-hydroxytetradecanoic acid, iproic acid, 2,2-dimethyl-3-hydroxypropionic acid, 2-hydroxyhexadecanoic acid, jalapinoic acid, juniperic acid, ambrettolic acid, aleuritic acid, 2-hydroxyoctadecanoic acid, 12-hydroxyoctadecanoic acid, 18-hydroxyoctadecanoic acid, 9,10-dihydroxyoctadecanoic acid, ricinoleic acid, kamlolenic acid, licanic acid, ferronic acid, cerebronic acid, 2-methyl-7-oxabicyclo[2.2.1]-5-heptene-2-carboxylic acid and the like; monocarboxylic acids such as halogen substituted forms such as chloroacetic acid, 2-chloroacrylic acid, chlorobenzoic acid and the like; and the like. Examples of the aliphatic dicarboxylic acid include saturated dicarboxylic acids such as adipic acid, azelaic acid, pimelic acid, suberic acid, sebacic acid, ethylmalonic acid, glutaric acid, oxalic acid, malonic acid, succinic acid, oxydiacetic acid, dimethylmalonic acid, ethylmethylmalonic acid, diethylmalonic acid, 2,2-dimethylsuccinic acid, 2,2-diethylsuccinic acid, 2,2-dimethylglutaracid, 1,2,2-trimethyl-1,3-cyclopentanedicarboxylic acid and the like; unsaturated dicarboxylic acids such as maleic acid, fumaric acid, acetylenedicarboxylic acid, itaconic acid and the like, and the like. As the aliphatic polycarboxylic acid, tricarboxylic acids such as aconitic acid, 4,4-dimethyl aconitic acid, citric acid, isocitric acid, 3-methylisocitric acid and the like, and the like can be mentioned. Examples of the aromatic carboxylic acid include aromatic monocarboxylic acids such as benzoic acid, 9-anthracenecarboxylic acid, atrolactic acid, anisic acid, isopropylbenzoic acid, salicylic acid, toluoyl acid and the like; aromatic polycarboxylic acids such as phthalic acid, isophthalic acid, terephthalic acid, carboxyphenylacetic acid, pyromellitic acid and the like, and the like.

Of these, a metal salt of monocarboxylic acid is more preferable, and a metal salt of chain monocarboxylic acid is more preferable in view of the good compatibility with component (A).

When a carboxylic acid having an acid group in component (B) has a high melting point (high crystallinity), its metal salt also becomes difficult to handle (poor workability). Accordingly, the melting point of the carboxylic acid having an acid group in component (B) is preferably not more than 65° C., more preferably −50° C. to 50° C., particularly preferably −40° C. to 35° C.

Moreover, the carboxylic acid having an acid group in component (B) preferably has 5 to 20 carbon atoms, more preferably 6 to 18 carbon atoms, particularly preferably 8 to 12 carbon atoms. When the number of carbon atoms is more than this range, component (B) tends to become a solid, show difficult compatibility with component (A) and fail to show the activity. On the other hand, when the number of carbon atoms is small, carboxylic acid becomes highly volatile, and the odor tends to increase due to carboxylic acid liberated from the component (B).

As mentioned above, availability, metal carboxylates such as 2-ethylhexanoic acid, octyl acid, oleic acid, naphtenoic acid, 2,2-dimethyloctanoic acid, 2-ethyl-2,5-dimethylhexanoic acid, neodecanoic acid, versatic acid and the like are preferable from the viewpoint of workability.

Particularly, metal carboxylates wherein the carbon atom adjacent to the carbonyl group is tertiary or quaternary carbon such as 2-ethylhexanoic acid, 2,2-dimethyloctanoic acid, 2-ethyl-2,5-dimethylhexanoic acid, neodecanoic acid, versatic acid and the like are preferable since the catalyst activity tends to be high.

Metal carboxylate may be used alone, or two or more kinds thereof may be used in combination.

The amount of component (B) to be used is preferably about 0.001-20 parts by weight, more preferably about 0.1-10 parts by weight, per 100 parts by weight of component (A). When the amount of component (B) to be mixed is lower than this range, the curing rate may be low, and the catalyst activity may decrease after storage. On the other hand, when the amount of component (B) to be mixed exceeds this range, usable life may become very short to degrade the workability.

The curable composition of the present invention contains, as an adhesion-imparting agent, a silane coupling agent (C) free of an amino group. The silane coupling agent here is a compound having a reactive silicon group and a functional group other than the reactive silicon group in a molecule, which shows a remarkable adhesiveness-improving effect when used for various objects to be applied, namely, inorganic base materials such as glass, aluminum, stainless, zinc, copper, mortar and the like, organic base materials such as vinyl chloride, acrylic, polyester, polyethylene, polypropylene, polycarbonate and the like, under nonprimer conditions or primer treatment conditions. When used under nonprimer conditions, an effect to improve adhesiveness to various objects to be applied is particularly remarkable. The compound can also function as a property controlling agent, an agent to improve dispersibility of inorganic fillers and the like. The amino group here means an unsubstituted amino group (—$NH_2$) and does not include a substituted amino group (—NHR, —$NR_2$).

Examples of the reactive silicon group of a silane coupling agent include groups represented by the formula (2) wherein X is a hydrolyzable group. Specifically, the group already recited as hydrolyzable groups can be used, and methoxy group, ethoxy group and the like are preferable from the hydrolysis rate. The number of the hydrolyzable groups is two or more, and particularly not less than 3 is preferable.

The functional group other than the reactive silicon group of component (C) of the present invention does not include an amino group (—$NH_2$). Generally, an amino group-containing silane coupling agent is preferably used as an adhesion-imparting agent. When an amino group-containing silane coupling agent is used in the present invention, the curability tends to decrease markedly. Thus, as the functional group other than the reactive silicon group of component (C) of the present invention, substituted amino group, mercapto group, epoxy group, carboxyl group, isocyanate group, isocyanurate, halogen and the like can be mentioned as examples. In addition, a silane coupling agent obtained by reacting an amino group-containing silane coupling agent with an epoxy group-containing compound and the like and modifying the amino group can be used as component (C). Of these, substituted (modified) amino group, epoxy group, isocyanate group, isocyanurate and the like are preferable because the adhesiveness improvement effect is higher.

Specific examples of component (C) include isocyanate group-containing silanes such as γ-isocyanatepropyltrimethoxysilane, γ-isocyanatepropyltriethoxysilane, γ-isocyanatepropylmethyldiethoxysilane, γ-isocyanatepropylmethyldimethoxysilane, isocyanatemethyltrimethoxysilane, isocyanatemethyltriethoxysilane, isocyanatemethyldimethoxymethylsilane, isocyanatemethyldiethoxymethylsilane and the like; substituted amino group-containing silanes such as N-phenyl-γ-aminopropyltrimethoxysilane, N-phenylaminomethyltrimethoxysilane, N-benzyl-γ-aminopropyltrimethoxysilane, N-vinylbenzyl-γ-aminopropyltriethoxysilane, N-cyclohexylaminomethyltriethoxysilane, N-cyclohexylaminomethyldiethoxymethylsilane, N-phenylaminomethyltrimethoxysilane, N,N'-bis[3-(trimethoxysilyl) propyl]ethylenediamine and the like; ketimine silanes such as N-(1,3-dimethylbutylidene)-3-(triethoxysilyl)-1-propaneamine and the like; mercapto group-containing silanes such as γ-mercaptopropyltrimethoxysilane, γ-mercaptopropyltriethoxysilane, γ-mercaptopropylmethyldimethoxysilane, γ-mercaptopropylmethyldiethoxysilane, mercaptomethyltriethoxysilane, mercaptomethyltriethoxysilane and the like; epoxy group-containing silanes such as γ-glycidoxy propyltrimethoxysilane, γ-glycidoxy propyltriethoxysilane, γ-glycidoxy propylmethyldimethoxysilane, β-(3,4-epoxycyclohexyl)ethyltrimethoxysilane, β-(3,4-epoxycyclohexyl)ethyltriethoxysilane and the like; carboxysilanes such as β-carboxyethyltriethoxysilane, β-carboxyethylphenylbis(2-methoxyethoxy)silane, N-β-(carboxymethyl) aminoethyl-γ-aminopropyltrimethoxysilane and the like; vinyl unsaturated group-containing silanes such as vinyltrimethoxysilane, vinyltriethoxysilane, γ-methacryloyloxypropylmethyldimethoxysilane, γ-acryloyloxypropyltriethoxysilane, methacryloyloxymethyltrimethoxysilane and the like; halogen-containing silanes such as γ-chloropropyltrimethoxysilane and the like; isocyanuratesilanes such as tris(3-trimethoxysilylpropyl)isocyanurate and the like; and the like. In addition, modified amino group-containing silanes obtained by reacting amino group-containing silanes such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-(2-aminoethyl)aminoethyl)aminopropyltrimethoxysilane, γ-(6-aminohexyl)aminopropyltrimethoxysilane, 3-(N-ethylamino)-2-methylpropyltrimethoxysilane, γ-ureidopropyltrimethoxysilane, γ-ureidopropyltriethoxysilane, (2-aminoethyl)aminomethyltrimethoxysilane, and the like with an epoxy group-containing compound, an isocyanate group-containing compound or a (meth)acryloyl group-containing compound, including the aforementioned silanes, to modify the amino group can be mentioned as examples. Moreover, a condensation product obtained by partially condensing the above-mentioned silanes can also be used. Component (C) may be used alone, or two or more kinds thereof may be used in combination.

The amount of component (C) to be used in the present invention is preferably about 0.01-20 parts by weight, more preferably about 0.1-10 parts by weight, and particularly preferably about 1-7 parts by weight, per 100 parts by weight of component (A).

When the amount of component (C) to be mixed is below this range, sufficient adhesiveness may not be obtained. On the other hand, when the amount of component (C) to be mixed exceeds this range, practical curing rate may not be achieved, and curing reaction may not proceed sufficiently with ease.

Besides component (C) of the present invention, for example, epoxy resin, phenol resin, sulfur, alkyl titanates, aromatic polyisocyanate and the like can be used as an adhesion-imparting agent, though the adhesion-imparting agent is not particularly limited to these. The above-mentioned adhesion-imparting agent may be used alone, or two or more kinds thereof may be used in combination. In the aforementioned explanation, it is described that the curability of the curable composition of the present invention is degraded due to the amino group-containing silane coupling agent. However, as long as the effect of the present invention is not impaired, an amino group-containing silane coupling agent may be used.

The curable composition of the present invention may contain an amino group-containing compound (D). However, it is necessary that the amount of component (D) be 0-0.05 in a weight ratio relative to component (B). Generally, when a metal carboxylate is used as a curing catalyst, a combined use with an amine compound containing component (D) affords a curable composition showing better curability as compared to a single use of metal carboxylate. However, the present inventors have found that a curable composition superior in curability than conventional ones can be obtained by using, as the organic polymer for component (A), an organic polymer having hydrolytic silicon group having three hydroxyl groups or hydrolyzable groups on the silicon atom, metal carboxylate (B) as a catalyst, and component (C) as an adhesion-imparting agent, and reducing the content (ratio) of component (D), unlike conventional methods. In the present invention, the content of component (D) preferably small because curability becomes more superior, and component (D) is most preferably not contained substantially. The amino group of the amino group-containing compound in component (D) shows an unsubstituted amino group (—NH$_2$), and does not include substituted amino group (—NHR, —NR$_2$ and the like) and imino group.

Specific examples of the amino group-containing compound of component (D) include aliphatic primary amines such as methylamine, ethylamine, propylamine, isopropylamine, butylamine, amylamine, hexylamine, octylamine, 2-ethylhexylamine, nonylamine, decylamine, laurylamine, pentadecylamine, cetylamine, stearylamine, cyclohexylamine and the like; aromatic amines such as aniline and the like; and other amines such as monoethanolamine, 3-hydroxypropylamine, diethylenetriamine, triethylenetetramine, benzylamine, 3-methoxypropylamine, 3-lauryl oxypropylamine, 3-dimethylaminopropylamine, 3-diethylaminopropylamine, xylylenediamine, ethylenediamine, hexamethylenediamine, guanidine, and the like, though the examples are not limited to these.

As the curing catalyst of the present invention, metal carboxylate of component (B) can be used. As long as the effect of the present invention is not impaired, other curing catalysts can also be used. Specific examples include a carboxylic acid having an acid group of component (B) and its derivatives (carbonic anhydride, ester, amide, nitrile, acyl chloride); titanium compounds such as tetrabutyl titanate, tetrapropyl titanate, titanium tetrakis(acetylacetonate), bis(acetylacetonate) diisopropoxytitanium, diisopropoxytitanium bis (ethylacetoacetate) and the like; tetravalent organotin compounds such as dibutyltin dilaurate, dibutyltin maleate, dibutyltin phthalate, dibutyltin dioctanoate, dibutyltinbis(2-ethylhexanoate), dibutyltinbis(methylmaleate), dibutyltinbis (ethylmaleate), dibutyltinbis(butylmaleate), dibutyltinbis (octylmaleate), dibutyltinbis(tridecylmaleate), dibutyltinbis (benzylmaleate), dibutyltin diacetate, dioctyltinbis (ethylmaleate), dioctyltinbis(octylmaleate), dibutyltin dimethoxide, dibutyltinbis(nonylphenoxide), dibutenyltin oxide, dibutyltin oxide, dibutyltinbis(acetylacetonate), dibutyltin bis(ethylacetoacetate), reaction product of dibutyltin oxide and silicate compound, reaction product of dibutyltin oxide and phthalic acid ester and the like; organic aluminum compounds such as aluminumtris(acetylacetonate), aluminumtris(ethylacetoacetate), diisopropoxyaluminummethylacetoacetate and the like; zirconium compounds such as zirconiumtetrakis(acetylacetonate) and the like. By a combined use with these curing catalysts, the catalyst activity can be enhanced, and curing depth, thin layer curability, adhesiveness and the like can be improved. However, according to the amount of the organotin compound to be added, the recovery property, durability and creep resistance of the obtained cured product of the curable composition are degraded.

The composition of the present invention can contain a filler. As the filler, reinforcing filler such as fumed silica, precipitated silica, crystal silica, molten silica, dolomite, silicic anhydride, silicic hydride, and carbon black; filers such as ground calcium carbonate, colloidal calcium carbonate, magnesium carbonate, diatomite, sintered clay, clay, talc, titanium oxide, bentonite, organic bentonite, ferric oxide, aluminum fine powder, flint powder, zinc oxide, activated zinc, Shirasu-balloon, glass microballoon, organic microballoon of phenol resin and vinylidene chloride resin, resin powder such as PVC powder, PMMA powder and the like; fiber filler such as asbestos, glass fiber, filament and the like can be mentioned as examples. When a filler is used, the amount of use thereof is 1-250 parts by weight, preferably 10-200 parts by weight, relative to polymer 100 parts by weight of component (A).

The aforementioned filler can be dried in advance by dehydration including, as described in JP-A-2001-181532, uniformly mixing the filler with a dehydrating agent such as oxidation calcium and the like, sealing the mixture in a bag made of an air-tight material, and leaving the bag for a suitable time period. Using this low water content filler, the storage stability can be improved particularly in the case of a one-component composition.

In addition, when a highly transparent composition is to be obtained, a polymer powder made from a polymer such as methyl methacrylate and the like as a starting material, amorphous silica and the like can be used as a filler, as described in JP-A-11-302527. Furthermore, as described in JP-A-2000-38560, using hydrophobic silica which is a silicon dioxide fine powder having a hydrophobic group bonded on its surface and the like as a filler, a highly transparent composition can be obtained. While the surface of the silicon dioxide fine powder is generally a silanol group (—SiOH), by reacting the silanol group with an organic silicon halide, alcohol and the like, (—SiO-hydrophobic group) is produced to give hydrophobic silica. To be specific, the silanol group present on the surface of silicon dioxide fine powder is reacted with dimethylsiloxane, hexamethyldisilasane, dimethyldichlorosilane, trimethoxyoctylsilane, trimethylsilane and the like to form a bond. The silicon dioxide fine powder having a surface formed by silanol group (—SiOH) is called hydrophilic silica fine powder.

When a highly strength cured product is desired by the use of these fillers, a filler mainly selected from fumed silica, precipitated silica, crystal silica, molten silica, dolomite, silicic anhydride, water-containing silicic acid and carbon black, surface-treated ultrafine calcium carbonate, sintered clay, clay, active zinc and the like is preferable. When it is used within the range of 1-200 parts by weight relative to 100 parts by weight of an organic polymer (A) having a reactive silicon group, preferable results can be obtained. When a low strength cured product showing high elongation at break is desired, a filler mainly selected from titanium oxide, calcium carbonates such as ground calcium carbonate and the like, magnesium carbonate, talc, ferric oxide, zinc oxide, Shirasu-balloon and the like is used within the range of 5-200 parts by weight relative to 100 parts by weight of an organic polymer (A) having a reactive silicon group to afford preferable results. In general, calcium carbonate having a greater specific surface area shows greater improving effect on the strength at break, elongation at break and adhesiveness of the cured product. It is needless to say that these fillers can be used alone or two or more kinds thereof may be used in combination. When calcium carbonate is used, surface-treated ultrafine calcium carbonate and calcium carbonate having greater particle size such as ground calcium carbonate and the like are desirably used in combination. The particle size of the surface-treated ultrafine calcium carbonate is preferably not more than 0.5 μm, and the surface treatment is preferably a treatment with fatty acid or fatty acid salt. The particle size of the calcium carbonate having greater particle size is preferably not less than 1 μm and one free of a surface treatment can be used.

To afford improved workability (trowel-releasability and other properties) of the composition and matte surface of the cured product, addition of organic balloon or inorganic balloon is preferable. These fillers may be surface-treated, and only one kind thereof may be used or two or more kinds thereof may be used in combination. For improved workability (trowel-releasability and other properties), the particle size of the balloon is preferably not more than 0.1 mm. For matte surface of the cured product, it is preferably 5-300 μm.

For the reason that the composition of the present invention can afford good chemical resistance of the cured product and the like, it is preferably used as an adhesive for joints of exterior walls and exterior wall tiles of houses such as siding board, particularly ceramic siding board, and the like, an adhesive for exterior wall tiles that is left in the joints and the like. It is desirable that the design of the exterior wall matches the design of the sealing material. Particularly, high grade exterior walls comprising sputter coating, mixing with colored aggregate and the like have been increasingly used as exterior walls. When the composition of the present invention contains a scale-like or granular substance having a diameter of not less than 0.1 mm, preferably about 0.1-5.0 mm, the cured product matches such high grade exterior walls, and becomes superior in the chemical resistance. Therefore, the appearance of the cured product can be maintained for a long time since the composition is superior. The use of a granular substance produces a surface with a sanding-look or sandstone-look texture, and the use of a scale-like substance produces a concavo-convex surface due to the scale-like substance.

The preferable diameter, amount to be added, material and the like of the scale-like or granular substance are described in JP-A-9-53063 as follows.

The diameter is not less than 0.1 mm, preferably about 0.1-5.0 mm, and a suitable size is employed according to the material, pattern and the like of the exterior wall. Those having a diameter of about 0.2 mm-5.0 mm or about 0.5 mm-5.0 mm can also be used. In the case of a scale-like substance, the thickness is about 1/10-1/5 (about 0.01-1.00 mm) of the diameter. The scale-like or granular substance is mixed in advance with a main sealing material and delivered to a construction site as a sealing material, or mixed with a main sealing material at an actual construction site when in use.

The scale-like or granular substance is added in an amount of about 1-200 parts by weight relative to 100 parts by weight of a composition such as a sealing material composition, an adhesive composition and the like. The amount thereof to be added is suitably determined according to the size of each scale-like or granular substance, material, pattern and the like of the exterior wall.

As the scale-like or granular substance, natural substances such as silica sand, mica and the like, synthetic rubber, synthesis resin, inorganic products such as alumina and the like can be used. For better design of the substance filled in the joints, the substance is colored into a suitable color in accordance with the material, pattern and the like of the exterior wall.

Preferable finishing method and the like are described in JP-A-9-53063.

Moreover, when balloon (preferably having an average particle size of not less than 0.1 mm) is used for a similar purpose, a surface with a sanding-look or sandstone-look texture can be obtained and the weight can be reduced thereby. The preferable diameter, amount to be added, material and the like of the balloon are described in JP-A-10-251618 as follows.

The balloon is a spherical filler with a hollow inside. As the material of the balloon, inorganic materials such as glass, Shirasu, silica and the like, and organic materials such as phenol resin, urea resin, polystyrene, saran and the like can be mentioned. However the material is not limited to these alone and an inorganic material may be combined with an organic material, or multiple layers may be formed by lamination. Inorganic, organic or composite balloons can be used. In addition, the balloon to be used may be the same balloon or a mixture of plural kinds of balloons made of different materials. Furthermore, the surface of the balloon to be used may be processed or coated, or the surface thereof may be treated with various kinds of surface treating agents. For example, coating an organic balloon with calcium carbonate, talc, titanium oxide and the like or surface treating an inorganic balloon with a silane coupling agent and the like can be mentioned as examples.

To obtain a surface with a sanding-look or sandstone-look texture, the particle size of the balloon is preferably not less than 0.1 mm. Those having a particle size of about 0.2 mm-5.0 mm or about 0.5 mm-5.0 mm can also be used. When the particle size is less than 0.1 mm, the texture may not be expressed even if the balloon is added in a large amount, which only increases the viscosity of the composition. The amount of the balloon to be added can be easily set according to the extent of the desired sanding-look or sandstone-look texture. Generally, addition of a balloon having a particle size of not less than 0.1 mm in an amount corresponding to a volume density of 5-25 vol % in the composition is preferable. When the volume density of the balloon is less than 5 vol %, the texture is absent, and when it exceeds 25 vol %, the viscosity of the sealing material and adhesive becomes high and the workability becomes poor. In addition, the modulus of the cured product becomes high and the basic property of a sealing material and an adhesive tends to be impaired. The volume density at which the balance with the basic property of a sealing material is particularly preferable is 8-22 vol %.

When a balloon is used, a slip preventive described in JP-A-2000-154368, and an amine compound described in JP-A-2001-164237, which affords a concavo-convex and matte surface of a cured product, particularly primary and/or secondary amine having a melting point of not less than 35° C., can be added.

Specific examples of the balloon are shown in JP-A-2-129262, JP-A-4-8788, JP-A-4-173867, JP-A-5-1225, JP-A-7-113073, JP-A-9-53063, JP-A-10-251618, JP-A-2000-154368, JP-A-2001-164237, WO97/05201 and the like.

In addition, thermally expandable hollow granules described in JP-A-2004-51701, JP-A-2004-66749 and the like can be used. The thermally expandable hollow granules are plastic spheres obtained by enclosing a low boiling point compound such as hydrocarbon having 1 to 5 carbon atoms and the like with a polymer outer shell material (vinylidene chloride copolymer, acrylonitrile copolymer, or vinylidene chloride-acrylonitrile copolymer) in spheres. When the areas of adhesion with this composition are heated, the gas pressure in the shell of the thermally expandable hollow granules increases, and the polymer outer shell material is softened to strikingly increase the volume, which detaches the adhesive interface. By the addition of thermally expandable hollow granules, a material can be detached with ease only by heating when it is not desired, without destruction of the material, and thus, an adhesive composition capable of detaching without using an organic solvent at all can be obtained.

Even when the composition of the present invention contains sealing material cured product particles, the cured product forms concaves and convexes on the surface and improve the design. The preferable diameter, amount to be added, material and the like of the sealing material cured product particles are described in JP-A-2001-115142 as follows. The diameter is preferably 0.1 mm-1 mm, further about 0.2-0.5 mm. The amount to be added is preferably 5-100 wt %, further 20-50 wt %, of a curable composition. While the material is not limited as long as it can be used for sealing materials, urethane resin, silicone, modified silicone, polysulfide rubber and the like can be mentioned as examples, with preference given to modified silicone sealing materials.

In addition, the composition of the present invention can contain silicate. The silicate acts as a crosslinking agent and has a function to improve recovery property, durability, and creep resistance of an organic polymer, i.e., component (A), of the present invention. Furthermore, silicate also has an effect to improve the adhesiveness and water-resistant adhesiveness, as well as adhesion durability under high temperature and high humidity conditions. As silicate, tetraalkoxysilane or a partially hydrolyzed condensate thereof can be used. When silicate is used, the amount thereof to be used is preferably 0.1-20 parts by weight, more preferably 0.5-10 parts by weight, per 100 parts by weight of the organic polymer in component (A).

Specific examples of silicate include tetraalkoxysilanes (tetraalkyl silicates) such as tetramethoxysilane, tetraethoxysilane, ethoxytrimethoxysilane, dimethoxydiethoxysilane, methoxytriethoxysilane, tetra-n-propoxysilane, tetra-i-propoxysilane, tetra-n-butoxy silane, tetra-i-butoxysilane, tetra-t-butoxysilane and the like, and a partially hydrolyzed condensate thereof.

The partially hydrolyzed condensate of tetraalkoxysilane is more preferable because it shows a greater improvement effect on the resilience, durability and creep resistance of the present invention than with tetraalkoxysilane.

As the aforementioned partially hydrolyzed condensate of tetraalkoxysilane, for example, one obtained by hydrogenation of tetraalkoxysilane by a conventional method to allow partial hydrolysis and then condensation thereof can be mentioned as an example. In addition, as the partially hydrolyzed condensate of organosilicate compound, a commercially available product can be used. As such condensates, for example, methyl silicate 51, ethyl silicate 40 (both manufactured by COLCOAT CO., LTD.) and the like can be mentioned as examples.

The composition of the present invention can contain a plasticizer. By the addition of a plasticizer, viscosity and slump property of the curable composition and the mechanical property such as tensile strength, elongation and the like of the cured product obtained by curing the composition can be controlled. Examples of the plasticizer include phthalic acid esters such as dibutyl phthalate, diheptyl phthalate, bis (2-ethylhexyl)phthalate, butylbenzyl phthalate and the like; nonaromatic dibasic esters such as dioctyl adipate, dioctyl sebacate, dibutyl sebacate, diisodecyl succinate and the like; aliphatic esters such as butyl oleate, methyl acetylricinolate and the like; phosphate esters such as tricresyl phosphate, tributyl phosphate and the like; trimellitic esters; chlorinated paraffins; hydrocarbon oils such as alkyldiphenyl, partially hydrogenated terphenyl and the like; process oils; epoxy plasticizers such as epoxidized soybean oil, benzyl epoxystearate and the like.

In addition, high molecular weight plasticizer can be used. When a high molecular weight plasticizer is used, the initial properties can be maintained for a long time, as compared to the use of a low molecular weight plasticizer that does not contain a polymer component in a molecule. Furthermore, the drying performance (also referred to as coatability) when alkyd paint is applied to the cured product can be improved. Specific examples of the high molecular weight plasticizer include, but are not limited to, vinyl polymers obtained by polymerization of vinyl monomers by various methods; esters of polyalkylene glycol such as diethyleneglycol dibenzoate, triethyleneglycol dibenzoate, pentaerythritol ester and the like; polyester plasticizers obtained from dibasic acid such as sebacic acid, adipic acid, azelaic acid, phthalic acid and the like and divalent alcohol such as ethylene glycol, diethylene glycol, triethylene glycol, propylene glycol, dipropylene glycol and the like; polyether polyols having a molecular weight of not less than 500, and further not less than 1000, such as polyethylene glycol, polypropylene glycol, polytetramethylene glycol and the like and polyethers such as derivatives of these polyether polyols wherein the hydroxyl group has been converted to an ester group, an ether group and the like, and the like; polystyrenes such as polystyrene, poly-α-methylstyrene and the like; polybutadiene, polybutene, polyisobutylene, butadiene-acrylonitrile, polychloroprene and the like.

Of these high molecular weight plasticizers, one compatible with the polymer of component (A) is preferable. From such viewpoint, polyethers and vinyl polymers are preferable. Use of polyether as a plasticizer is preferable, since surface curability and curing depth can be improved, cure retardation after storage does not occur. Particularly, polypropylene glycol is more preferable. In addition, vinyl polymer is preferable from the viewpoint of compatibility, weatherability and heat resistance. Of the vinyl polymers, acrylic polymers and/or methacrylic polymers are preferable, and acrylic polymers such as polyacrylic alkyl ester and the like are more preferable. As the synthetic method of this polymer, living radical polymerization is preferable, since the molecular weight distribution is narrow and low viscosity can be achieved. Atom transfer radical polymerization is more preferable. In addition, a polymer obtained by continuous bulk polymerization of an acrylic acid alkylester monomer described in JP-A-2001-207157 at a high temperature and high pressure, i.e., SGO process, is preferably used.

The number average molecular weight of the high molecular weight plasticizer is preferably 500-15000, more preferably 800-10000, still more preferably 1000-8000, and particularly preferably 1000-5000. Most preferably, it is 1000-3000. When the molecular weight is too low, a plasticizer flows out due to heat or rainfall, the initial properties cannot be maintained for a long time, and alkyd coatability cannot be improved. When the molecular weight is too high, the viscosity becomes high and the workability becomes poor. While the molecular weight distribution of high molecular weight plasticizer is not particularly limited, it is preferably narrow, and preferably less than 1.80. It is more preferably not more than 1.70, still more preferably not more than 1.60, further preferably not more than 1.50, particularly preferably not more than 1.40 and most preferably not more than 1.30.

The number average molecular weight is measured by a terminal group analysis in the case of polyether polymers, and GPC method in the case of other polymers. In addition, the molecular weight distribution (Mw/Mn) is measured by GPC method (based on polystyrene).

The high molecular weight plasticizer may or may not contain a reactive silicon group. When it contains a reactive silicon group, the plasticizer acts as a reactive plasticizer, and prevents transfer of a plasticizer from the cured product. When it contains a reactive silicon group, the number of the group is preferably not more than 1, further not more than 0.8, on average per one molecule. When a plasticizer containing a reactive silicon group, particularly an oxyalkylene polymer containing a reactive silicon group, is used, its number average molecular weight needs to be smaller than that of the polymer of component (A).

The plasticizer may be used alone, or two or more kinds thereof may be used in combination. A low molecular weight plasticizer and a high molecular weight plasticizer may be used in combination. These plasticizers can also be added during production of the polymer.

The amount of the plasticizer to be used is 5-150 parts by weight, preferably 10-120 parts by weight, more preferably 20-100 parts by weight, per 100 parts by weight of the polymer of component (A). When it is less than 5 parts by weight, the effect of a plasticizer is not expressed and when it exceeds 150 parts by weight, the mechanical strength of the cured product becomes insufficient.

The composition of the present invention can contain a tackifier. While the tackifier resin is not particularly limited, any that is generally used can be used, whether solid or liquid at ambient temperature. Specific examples include styrene block copolymer, its hydrogenated product, phenol resin, modified phenol resin (for example, cashew oil modified phenol resin, tall oil modified phenol resin etc.), terpene phenol resin, xylene-phenol resin, cyclopentadiene-phenol resin, coumaroneinden resin, rosin resin, rosin ester resin, hydrogenated rosin ester resin, xylene resin, low molecular weight polystyrene resin, styrene copolymer resin, petroleum resin (for example, C5 hydrocarbon resin, C9 hydrocarbon resin, C5C9 hydrocarbon copolymer resin etc.), hydrogenated petroleum resin, terpene resin, DCPD resin petroleum resin and the like. They may be used alone, or two or more kinds thereof may be used in combination. As the styrene block copolymer and its hydrogenated product, styrene-butadiene-styrene block copolymer (SBS), styrene-isoprene-styrene block copolymer (SIS), styrene-ethylenebutylene-styrene block copolymer (SEBS), styrene-ethylenepropylene-styrene block copolymer (SEPS), styrene-isobutylene-styrene block copolymer (SIBS) and the like can be mentioned as examples. The above-mentioned tackifier resin may be used alone, or two or more kinds thereof may be used in combination.

The tackifier resin is used in the range of 5-1,000 parts by weight, preferably 10-100 parts by weight, per 100 parts by weight of the organic polymer (A).

The composition of the present invention can contain a solvent or a diluent. While the solvent and diluent are not particularly limited, aliphatic hydrocarbon, aromatic hydrocarbon, alicyclic hydrocarbon, halogenated hydrocarbon, alcohol, ester, ketone, ether and the like can be used. When the solvent or diluent is used, the boiling point of the solvent is preferably not less than 150° C., more preferably not less than 200° C., particularly preferably not less than 250° C., in view of the problem of air pollution during indoor use of the composition. The above-mentioned solvent and diluent may be used alone, or two or more kinds thereof may be used in combination.

The curable composition of the present invention may contain a physical property modifier, as necessary, that controls the tensile property of the obtained cured product. While the physical property modifier is not particularly limited, for example, alkylalkoxysilanes such as methyltrimethoxysilane, dimethyldimethoxysilane, trimethylmethoxysilane, n-propyltrimethoxysilane and the like; alkoxysilanes having an unsaturated group, such as alkylisopropenoxysilane (e.g., dimethyldiisopropenoxysilane, methyltriisopropenoxysilane and the like), vinyltrimethoxysilane, vinyldimethylmethoxysilane, and the like; silicone varnish; polysiloxanes and the like can be mentioned. Using the aforementioned physical property modifier, the hardness of the composition of the present invention may be increased during curing or conversely decreased to enable elongation at break. The above-mentioned physical property modifier may be used alone, or two or more kinds thereof may be used in combination.

Particularly, a compound that forms a compound having a monovalent silanol group in a molecule by hydrolysis decreases the modulus of the cured product without worsening the stickiness of the surface of the cured product. Particularly, a compound forming trimethylsilanol is preferable. As a compound that forms a compound having a monovalent silanol group in a molecule by hydrolysis, a compound described in JP-A-5-117521 can be mentioned as an example. In addition, a compound forming a derivative of alkyl alcohol such as hexanol, octanol, decanol and the like, which forms a silicone compound that forms $R_3SiOH$ such as trimethylsilanol and the like by hydrolysis, a compound that forms a silicone compound that forms $R_3SiOH$ such as trimethylsilanol and the like by hydrolysis, which is a derivative of polyvalent alcohol having not less than 3 hydroxyl groups, such as trimethylolpropane, glycerol, pentaerythritol, sorbitol and the like as described in JP-A-11-241029 can be mentioned as examples.

Moreover, a compound that forms a silicone compound that forms $R_3SiOH$ such as trimethylsilanol and the like by hydrolysis, which is a derivative of an oxypropylene polymer described in JP-A-7-258534 can be mentioned as an example. Furthermore, a polymer having a silicon-containing group, which can be a monosilanol-containing compound by hydrolysis with a crosslinkable hydrolyzable silicon-containing group as described in JP-A-6-279693 can also be used.

The physical property modifier is used in the range of 0.1-20 parts by weight, preferably 0.5-10 parts by weight, per 100 parts by weight of an organic polymer (A) having a reactive silicon group.

The curable composition of the present invention may contain a thixotropic agent (anti-sagging agent), as necessary, to prevent sagging and improve workability. While the anti-sagging agent is not particularly limited, for example, polyamide wax; hydrogenated castor oil derivatives; metal soaps such as calcium stearate, aluminum stearate, barium stearate and the like, and the like can be mentioned as examples. When a rubber powder having a particle size of 10-500 μm as described in JP-A-11-349916 or an organic fiber as described in JP-A-2003-155389 is used, a composition showing high thixotropy and good workability can be obtained. Such thixotropic agent (anti-sagging agent) may be used alone, or two or more kinds thereof may be used in combination. The thixotropic agent is used in the range of 0.1-20 parts by weight per 100 parts by weight of organic polymer (A) having a reactive silicon group.

The composition of the present invention can contain a compound having an epoxy group in a molecule. By the use of a compound having an epoxy group, the recovery property of the cured product can be increased. As a compound having an epoxy group, compounds such as epoxydized unsaturated fats and oils, epoxydized unsaturated fatty acid esters, alicyclic epoxy compounds, epichlorohydrin derivative and mixtures thereof and the like can be mentioned as examples. Specifically, epoxydized soy bean oil, epoxydized linseed oil, bis(2-ethylhexyl)-4,5-epoxycyclohexane-1,2-dicarboxylate (E-PS), epoxyoctylstearate, epoxybutylstearate and the like can be mentioned as examples. Of these, E-PS is particularly preferable. The epoxy compound is used in the range of 0.5-50 parts by weight per 100 parts by weight of organic polymer (A) having a reactive silicon group.

The composition of the present invention can contain a photocurable substance. When a photocurable substance is used, a film of the photocurable substance is formed on the surface of the cured product, the stickiness and weatherability of the cured product can be improved. The photocurable substance has a molecular structure that undergoes chemical change in a considerably short time due to the action of light and shows changes in the property such as curing and the like. As such kind of compounds, many are known including organic monomers, oligomers, resins, compositions containing them and the like, and any commercially available one can be used. As representative ones, unsaturated acrylic compound, vinyl polycinnamate, azide resin and the like can be used. As the unsaturated acrylic compound, monomer and oligomer having one to several acrylic or methacrylic unsaturated groups, or a mixture thereof and the like can be mentioned, and examples thereof include monomers such as propylene (or butylene, ethylene) glycol di(meth)acrylate, neopentylglycol di(meth)acrylate and the like, and oligoesters having a molecular weight of 10,000 or below. Specifically, for example, special acrylate (two functional) Aronix M-210, Aronix M-215, Aronix M-220, Aronix M-233, Aronix M-240, Aronix M-245; (three functional) Aronix M-305, Aronix M-309, Aronix M-310, Aronix M-315, Aronix M-320, Aronix M-325, and (multifunctional) Aronix M-400 and the like can be mentioned as examples. Particularly, a compound containing an acrylic functional group is preferable, and a compound containing not less than three, same functional groups on average in a molecule is preferable. All the aforementioned Aronix are the products of Toagosei Co., Ltd.

Examples of vinyl polycinnamate include a photosensitive resin with a cinnamoyl group as a photosensitive group, wherein polyvinyl alcohol has been esterified with cinnamic acid, and other many vinyl polycinnamate derivatives. The azide resin is known as a photosensitive resin with an azido group as a photosensitive group, and includes a rubber photosensitive liquid generally containing diazide compound as a photosensitizer, and those exemplified in detail in "Photosensitive Resin" (Insatsu Gakkai Shuppanbu Ltd., page 93-, page 106-, page 117-, Mar. 17, 1972). They may be used alone or in a mixture, or after adding a sensitizer as necessary. The effect may be enhanced by the addition of a sensitizer such as ketones, nitro compounds and the like, or a promoter such as amines and the like. The photocurable substance is preferably used in the range of 0.1-20 parts by weight, preferably 0.5-10 parts by weight, per 100 parts by weight of organic polymer (A) having a reactive silicon group. When the amount is not more than 0.1 part by weight, the weatherability is not enhanced, and when the amount is not less than 20 parts by weight, the cured product becomes too hard and tends to crack.

The composition of the present invention can contain an oxygen curable substance. As the oxygen curable substance, an unsaturated compound reactive with oxygen in the air can be mentioned as an example. It reacts with oxygen in the air to form a cured film near the surface of the cured product, thereby preventing stickiness of the surface and attachment of dirt and dust on the surface of the cured product and the like. Specific examples of the oxygen curable substance include dry oil represented by tung oil, linseed oil and the like, various alkyd resins obtained by modifying the compound; acrylic polymer modified by dry oil, epoxy resin, silicone resin; liquid polymers such as 1,2-polybutadiene, 1,4-polybutadiene, C5-C8 diene polymer and the like obtained by polymerization or copolymerization of diene compounds such as butadiene, chloroprene, isoprene, 1,3-pentadiene and the like, liquid copolymers such as NBR, SBR and the like obtained by copolymerization of monomers such as acrylonitrile, styrene and the like, which are copolymerizable with these diene compounds, such that the diene compound becomes the main component, various modification products thereof (maleic modification products, boil oil modification products and the like) and the like. They may be used alone, or two or more kinds thereof may be used in combination. Of these, tung oil and liquid diene polymer are particularly preferable. In addition, a combined use of a catalyst promoting the oxidation curing reaction or a metal dryer may enhance the effect. As such catalyst and metal dryer, metal salts such as cobalt naphthenate, lead naphthenate, zirconium naphthenate, cobalt octylate, zirconium octylate and the like, amine compound and the like can be mentioned as examples. The oxygen curable substance is used in an amount of 0.1-20 parts by weight, more preferably 0.5-10 parts by weight, per 100 parts by weight of organic polymer (A) having a reactive silicon group. When the aforementioned amount of use is less than 0.1 part by weight, improvement of staining property becomes insufficient, and when it exceeds 20 parts by weight, the tensile property and the like of the cured product are tend to be impaired. As described in JP-A-3-160053, the oxygen curable substance is preferably used in combination with an photocurable substance.

The composition of the present invention can contain an antioxidant (anti-aging agent). The use of an antioxidant enhances the heat resistance of the cured product. As the antioxidant, hindered phenol, monophenol, bisphenol, polyphenol antioxidants can be mentioned as examples, with particular preference given to hindered phenol. Simultaneously, hindered amine photostabilizers such as Tinuvin 622LD, Tinuvin 144, CHIMASSORB944LD, CHIMASSORB119FL (all manufactured by Chiba Specialty Chemicals K.K.); MARK LA-57, MARK LA-62, MARK LA-67, MARK LA-63, MARK LA-68 (all manufactured by Adeca Corporation); Sanol LS-770, Sanol LS-765, Sanol LS-292, Sanol LS-2626, Sanol LS-1114, Sanol LS-744 (all manufactured by Sankyo Co., Ltd.) can also be used. Specific examples of the antioxidant are also described in JP-A-4-283259 and JP-A-9-194731. The antioxidant is used in an amount of 0.1-10 parts by weight, more preferably 0.2-5 parts by weight, per 100 parts by weight of organic polymer (A) having a reactive silicon group.

The composition of the present invention can contain a photostabilizer. The use of a photostabilizer prevents photooxidative degradation of cured products. As the photostabilizer, benzotriazole, hindered amine, benzoate compounds and the like can be mentioned as examples, with particular preference given to hindered amine compounds. The photostabilizer is used in an amount of 0.1-10 parts by weight, more preferably 0.2-5 parts by weight, per 100 parts by weight of organic polymer (A) having a reactive silicon group. Specific examples of photostabilizers are also described in JP-A-9-194731.

When a photocurable substance, particularly an unsaturated acrylic compound, is concurrently used with the composition of the present invention, a tertiary amine-containing hindered amine photostabilizer is preferably used as a hindered amine photostabilizer for improving the storage stability of the composition, as described in JP-A-5-70531. As the tertiary amine-containing hindered amine photostabilizer, photostabilizers such as Tinuvin 622LD, Tinuvin 144, CHIMASSORB119FL (all manufactured by Chiba Specialty Chemicals K.K.); MARK-LA-57, LA-62, LA-67, LA-63 (all manufactured by Adeca Corporation); Sanol LS-765, LS-292, LS-2626, LS-1114, LS-744 (all manufactured by Sankyo Co., Ltd.) and the like can be mentioned as examples.

The composition of the present invention can contain a UV absorber. The use of a UV absorber increases the surface weatherability of the cured product. As the UV absorber, benzophenone, benzotriazole, salycilate, substituted tolyl and metal chelate compounds and the like can be mentioned as examples, with particular preference given to benzotriazole compounds. The UV absorber is used in an amount of 0.1-10 parts by weight, more preferably 0.2-5 parts by weight, per 100 parts by weight of organic polymer (A) having a reactive silicon group. It is preferable to use a phenol or hindered phenol antioxidant, a hindered amine photostabilizer and a benzotriazole UV absorber in combination.

The composition of the present invention can contain an epoxy resin. A composition containing an epoxy resin is particularly preferable as an adhesive, especially an adhesive for exterior wall tiles. As the epoxy resin, flame-retardant epoxy resins such as epichlorohydrin-bisphenol A epoxy resin, epichlorohydrin-bisphenol F epoxy resin, tetrabromobisphenol A glycidyl ether and the like, polyvalent alcohol glycidyl ethers such as novolac epoxy resin, hydrogenated bisphenol A epoxy resin, glycidyl ether epoxy resin of bisphenol A propylene oxide addition product, p-oxybenzoic acid glycidyl ether ester epoxy resin, urethane modified epoxy resin, various alicyclic epoxy resin, N,N-diglycidyl aniline, N,N-diglycidyl-o-toluidine, triglycidyl isocyanurate, polyalkyleneglycol diglycidyl ether, glycerol and the like, epoxy product of unsaturated polymers such as hydantoin epoxy resin, petroleum resin and the like, and the like can be mentioned as examples. Examples are not limited to these and conventional epoxy resins can be used. A resin having at least two epoxy groups in a molecule is preferable since it shows high reactivity during curing and the cured product easily forms a three-dimensional network and the like. More preferred are bisphenol A epoxy resins, novolac epoxy resins and the like. The epoxy resin and an organic polymer having a reactive silicon group (A) are used within the range of (A)/epoxy resin=100/1-1/100 in a weight ratio. When the ratio of (A)/epoxy resin is less than 1/100, improvement of the impact strength and toughness of an epoxy resin cured product is difficult to achieve, and when the ratio of (A)/epoxy resin exceeds 100/1, the strength of the organic polymer cured product becomes insufficient. While the preferable ratio of use cannot be determined automatically since it varies depending on the use of a curable resin composition and the like, for example, to improve the impact resistance, flexibility, toughness, peel strength and the like of the epoxy resin cured product, component (A) is used in an amount of 1-100 parts by weight, more preferably 5-100 parts by weight, per 100 parts by weight of the epoxy resin. In contrast, to improve the strength of the cured product of component (A), the epoxy resin is used in an amount of 1-200 parts by weight, more preferably 5-100 parts by weight, per 100 parts by weight of the component (A).

When an epoxy resin is added, the composition of the present invention can naturally contain a curing agent to cure the epoxy resin. However, of the conventionally used epoxy resin curing agents, primary amines may impair the rapid curability, the effect of the present invention. Therefore, examples of the usable epoxy resin curing agents include, but are not limited to, secondary amines; tertiary amines such as 2,4,6-tris(dimethylaminomethyl)phenol and tripropylamine and salts of these tertiary amines; polyamide resins; imidazoles; dicyanodiamides; boron trifluoride complex compounds; carboxylic acid anhydrides such as phthalic anhydride, hexahydrophthalic anhydride, tetrahydrophthalic anhydride, dodecinyl succinic anhydride, pyromellitic anhydride, chlorendic anhydride and the like; alcohols; phenols; carboxylic acids; diketone complex compound of aluminum or zirconium and the like. The curing agent may be used alone, or two or more kinds thereof may be used in combination.

When a curing agent of epoxy resin is used, it is used in the range of 0.1-300 parts by weight per 100 parts by weight of the epoxy resin.

As a curing agent of an epoxy resin, ketimine can be used. Ketimine is stably present in a state free of moisture, and decomposed into primary amine and ketone by reacting with moisture, and the resulting primary amine is a room temperature-curable curing agent of the epoxy resin. Use of ketimine affords a one-component composition. Such ketimine can be obtained by the condensation reaction of an amine compound and a carbonyl compound.

For the synthesis of ketimine, known amine compounds and carbonyl compounds may be used. For example, as the amine compound, diamines such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phenylenediamine, p,p'-phenylenediamine and the like; polyvalent amines such as 1,2,3-triaminopropane, triaminobenzene, tris(2-aminoethyl)amine, tetrakis(aminomethyl)methane and the like; polyalkylenepolyamines such as diethylenetriamine, triethylenetriamine, tetraethylenepentamine and the like; polyoxyalkylene polyamine; aminosilanes such as γ-aminopropyltriethoxysilane, N-(β-aminoethyl)-γ-aminopropyltrimethoxysilane, N-(β-aminoethyl)-γ-aminopropylmethyldimethoxysilane and the like; and the like can be used. As the carbonyl compound, aldehydes such as acetoaldehyde, propionaldehyde, n-butylaldehyde, isobutylaldehyde, diethylacetoaldehyde, glyoxal, benzaldehyde and the like; cyclic ketones such as cyclopentanone, trimethylcyclopentanone, cyclohexanone, trimethylcyclohexanone and the like; aliphatic ketones such as acetone, methylethylketone, methylpropylketone, methylisopropylketone, methylisobutylketone, diethylketone, dipropylketone, diisopropylketone, dibutylketone, diisobutylketone and the like; β-dicarbonyl compounds such as acetylacetone, methyl acetoacetate, ethyl acetoacetate, dimethyl malonate, diethyl malonate, methylethyl malonate, dibenzoylmethane and the like; and the like can be used.

When an imino group is present in ketimine, the imino group may be reacted with styrene oxide glycidyl ethers such as butylglycidyl ether, allylglycidyl ether and the like; glycidyl ester and the like. The ketimine may be used alone, or two or more kinds thereof may be used in combination. It is used in an amount of 1-100 parts by weight per 100 parts by weight of the epoxy resin, where the amount of use varies depending on the kind of epoxy resin and ketimine.

However, as mentioned above, primary amine, namely an amino group-containing compound, tends to decrease the curability markedly in the present invention. Thus, when ketimine is to be used, it is assumed that the curability of the curable composition varies depending on the competition in the primary amine production between silanol condensation reaction of organic polymer (A) and decomposition of ketimine. When sufficient curability is not obtained, therefore, an epoxy resin curing agent other than primary amine and ketimine is preferably used.

The curable composition of the present invention can contain a phosphorus plasticizer such as ammonium polyphosphate, tricresylphosphate and the like, and a flame-retardant such as aluminum hydroxide, magnesium hydroxide, and thermally expandable black lead and the like. The above-mentioned flame-retardant may be used alone, or two or more kinds thereof may be used in combination.

The flame-retardant is used in the range of 5-200 parts by mass, preferably 10-100 parts by mass, per 100 parts by weight of the total of component (A) and component (B).

The curable composition of the present invention can contain various additives, as necessary, so as to control various properties of the curable composition or cured products. Examples of such additives include curability adjusting agent, radical inhibitor, metal inactivation agent, ozone degradation preventive, phosphorus peroxide decomposing agent, lubricant, pigment, bubbling agent, repellent for ants, fungicide and the like. Such various additives may be used alone, or two or more kinds thereof may be used in combination. Specific examples of the additives other than those recited in the present specification are described, for example, in JP-B-4-69659, JP-B-7-108928, JP-A-63-254149, JP-A-64-22904, JP-A-2001-72854 and the like.

The curable composition of the present invention can be prepared as a one component type which, after application, cures by the humidity in the air, by tightly sealing all mixing components in advance for storage. Alternatively, it can also be prepared as a two component type by separately mixing, as a curing agent, components such as curing catalyst, filler, plasticizer, water and the like, where the components and a polymer composition are mixed before use. From the viewpoint of workability, one component type is preferable.

When the aforementioned curable composition is of a one component type, since all mixing components are mixed in advance, mixing components containing water are preferably used after dehydration drying, or dehydrated during kneading under reduced pressure and the like. When the aforementioned curable composition is of a two component type, since a curing catalyst does not need to be added to the main agent containing a polymer having a reactive silicon group, a slight amount of water present in the additive does not cause a concern about gelling. However, when long-term storage stability is required, application of dehydration drying is preferable. As a method for dehydrating and drying, drying by heating such as powder and the like is preferable for solid, and reduced pressure dehydration or dehydration using synthetic zeolite, active alumina, silica gel, calcium oxide, magnesium oxide and the like is preferable for liquid. It is also possible to add a small amount of an isocyanate compound to allow reaction of the isocyanate group with water, thus achieving dehydration. Moreover, an oxazolidine compound such as 3-ethyl-2-methyl-2-(3-methylbutyl)-1,3-oxazolidine and the like may be added to allow reaction with water to achieve dehydration. In addition to such dehydration and drying, lower alcohol such as methanol, ethanol and the like; alkoxysilane compounds such as n-propyltrimethoxysilane, vinyltrimethoxysilane, vinylmethyldimethoxysilane, methyl silicate, ethyl silicate, γ-mercaptopropylmethyldimethoxysilane, γ-mercaptopropylmethyldiethoxysilane, γ-glycidoxypropyltrimethoxysilane and the like may be added to further improve the storage stability.

The amount of the dehydrating agent, particularly a silicon compound reactive with water, such as vinyltrimethoxysilane and the like, to be used is preferably in the range of 0.1-20 parts by weight, preferably 0.5-10 parts by weight, per 100 parts by weight of organic polymer (A) having a reactive silicon group.

The preparation method of the curable composition of the present invention is not particularly limited and, for example, conventional methods including mixing the above-mentioned components, kneading the mixture in a mixer, roll, kneader and the like at ambient temperature or under heating, or using a small amount of a suitable solvent to dissolve the components, mixing them and the like can be employed.

The curable composition of the present invention forms a three-dimensional network tissue upon exposure to the moisture in the air, and cures into a solid having rubber-like elasticity.

The curable composition of the present invention can be used as an adhesive, or a sealing material, adhesive, paint, spraying material and the like for structures, boats and ships, automobiles, roads and the like. Since the cured product obtained by curing the curable composition of the present invention is superior in flexibility and adhesiveness, it is more preferably used as a sealing material or adhesive from the above uses.

In addition, the composition can be used for various uses including electric or electronic component materials such as solar battery rear surface sealant and the like, electrical insulating materials such as insulation coating agent for electric wire or cable and the like, elastic adhesive, contact-type adhesive, spray-type sealing material, crack repairing material, tiling adhesive, powder coating, medical adhesive, medical equipment sealing material, joint sealing material for jacket material such as sizing board and the like, coating material, primer, hot melt material, as well as rustproof or waterproof sealing material for wire glass or laminate glass end surface (cut section), liquid sealant used for automobile parts, electric parts, various machine components and the like, and the like. Moreover, since the composition can be closely adhered to a wide range of substrates such as glass, porcelain, lumber, metal, resin molded products and the like, with or without the aid of a primer, it can also be used as various types of tight-sealing composition or adhesive composition. Furthermore, since the curable composition of the present invention is also superior in recovery property, durability and creep resistance, it can be particularly preferably used as adhesive for interior panels, adhesive for exterior panels, tiling adhesive, stone finishing adhesive, ceiling finishing adhesive, floor finishing adhesive, wall finishing adhesive, vehicle paneling adhesive, electric or electronic or precision equipment assembly adhesive, sealing material for direct glazing, multi-layer glass sealing material, SSG method sealing material, or structure working joint sealing material.

EXAMPLES

The present invention is concretely explained in the following by referring to Examples and Comparative Examples, which are not to be construed as limitative.

Synthesis Example 1

Propylene oxide was polymerized using polyoxypropylenediol having a molecular weight of about 2,000 as an initiator and zinc hexacyanocobaltate glyme complex as a catalyst to give polypropylene oxide having a number average molecular weight of about 25,500 (molecular weight based on polystyrene as measured using HLC-8120GPC manufactured by Tosoh Corporation as a solution delivery system, TSK-GEL H type manufactured by Tosoh Corporation as a column and THF as a solvent) and a hydroxyl group in the terminal. Subsequently, a methanol solution of 1.2-fold equivalent of NaOMe relative to the hydroxyl group of the hydroxyl group terminal polypropylene oxide was added, methanol was evaporated, and allyl chloride was further added to convert the hydroxyl group at the terminal to an allyl group. Unreacted allyl chloride was removed by evaporation under reduced pressure. The obtained crude allyl group terminal polypropylene oxide (100 parts by weight) was mixed with n-hexane (300 parts by weight) and water (300 parts by weight) and the mixture was stirred. Water was removed by centrifugation. The obtained hexane solution was mixed with water (300 parts by weight) and the mixture was stirred. Water was removed again by centrifugation and hexane was removed by evaporation under reduced pressure. From the foregoing process, two functional polypropylene oxide (P-1) having an allyl group at the terminal and a number average molecular weight of about 25,500 was obtained.

The obtained allyl terminal polypropylene oxide (P-1) (100 parts by weight) was reacted with a silane compound (2.3 parts by weight) represented by the following chemical formula:

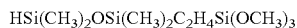

using an isopropanol solution (150 ppm) of platinum vinyl siloxane complex (platinum content 3 wt %) as a catalyst at 90° C. for 2 hr to give a trimethoxysilyl group terminal polyoxypropylene polymer (A-1). By the measurement of $^1$H-NMR (measured in $CDCl_3$ solvent using JNM-LA400 manufactured by JEOL Ltd.), the number of the trimethoxysilyl groups at the terminal was 1.1 per one molecule on average.

Synthesis Example 2

Using trimethoxysilane (1.1 parts by weight) instead of the silane compound in Synthesis Example 1 and by a similar operation as in Synthesis Example 1, a trimethoxysilyl group terminal polyoxypropylene polymer (A-2) was obtained. By the measurement of $^1$H-NMR (measured in $CDCl_3$ solvent using JNM-LA400 manufactured by JEOL Ltd.), the number of the trimethoxysilyl groups at the terminal was 1.3 per one molecule on average.

Synthesis Example 3

To a solution of the following monomer mixture in toluene, which was heated to 105° C., was added dropwise a solution of 2,2'-azobis(2-methylbutyronitrile) as a polymerization initiator over 5 hr, and "post-polymerization" was performed for 1 hr to give a (meth)acrylic acid ester polymer (A-3).

Methyl methacrylate (68 parts by weight), butyl acrylate (11 parts by weight), stearyl methacrylate (15 parts by weight), γ-methacryloxypropyltrimethoxysilane (6 parts by weight), mercaptopropyltrimethoxysilane (8 parts by weight), 2,2'-azobis(2-methylbutyronitrile) (2.8 parts by weight).

Synthesis Example 4

The polymer (A-1) obtained in Synthesis Example 1 and the polymer (A-3) obtained in Synthesis Example 3 were blended at a solid weight ratio of 60/40, and the solvent was evaporated to give a solvent-free polymer (A-4).

Synthesis Example 5

Using methyldimethoxysilane (0.9 parts by weight) instead of the silane compound in Synthesis Example 1 and by a similar operation as in Synthesis Example 1, a methyldimethoxysilyl group terminal polyoxypropylene polymer (A-5) was obtained. By the measurement of $^1$H-NMR (measured in $CDCl_3$ solvent using JNM-LA400 manufactured by JEOL Ltd.), the number of the methyldimethoxysilyl groups at the terminal was 1.3 per one molecule on average.

Examples 1, 2 and Comparative Examples 1-3

Polymer (A-1) as a polymer having a silicon group wherein 3 hydrolyzable groups are bonded per one silicon atom and a filler were thoroughly mixed with a three-roll mill according to the formulation shown in Table 1 to give a base material.

The base material, tin(II) carboxylate salt as a catalyst and various silane compounds were measured in amounts shown in the Table and thoroughly mixed with a spatula. After mixing for 3 min, the mixture was defoamed while stretching thin, filled in an ointment can and the surface thereof was smoothed. This time point was taken as a curing start time, the surface was touched with the spatula every minute, and the time when the mixture did not adhere to the spatula was taken as a skin formation time to perform the measurement. Further, the mixture was closely adhered to an adhesion substrate (glass, anode aluminum oxide) in about 30 mm length×1.5 mm width×1.0 mm thickness, aged under the constant temperature and humidity conditions at 23° C., 50% for 7 days, and the adhesiveness was evaluated by a 90 degree hand peel test. For the adhesiveness evaluation, the destruction state of the cured product was observed. In the Table, those showing not less than 50% of cohesive failure are indicated as A, and those showing less than 50% thereof are indicated as B. The results are shown in Table 1.

TABLE 1

| composition (parts by weight) | | | Example | | Comparative Example | | |
|---|---|---|---|---|---|---|---|
| | | | 1 | 2 | 1 | 2 | 3 |
| organic polymer (A) | A-1 | | 100 | 100 | 100 | 100 | 100 |
| filler | Hakuenka CCR[(1)] | Shiraishi Calcium Kaisha, Ltd. | 50 | 50 | 50 | 50 | 50 |
| metal carboxylate (B) | Neostann U-50[(2)] | Nitto Kasei Co., Ltd. | 3 | 3 | 3 | 3 | 3 |
| silane compound | aminosilane/epoxysilane reaction mixture[(3)] | | 3 | | | | |
| | A187[(4)] | Nippon Unicar Company Limited | | | 3 | | |

TABLE 1-continued

| composition (parts by weight) | | | Example 1 | Example 2 | Comparative Example 1 | Comparative Example 2 | Comparative Example 3 |
|---|---|---|---|---|---|---|---|
| | A1120[5] | Nippon Unicar Company Limited | | | 3 | | |
| | A171[6] | Nippon Unicar Company Limited | | | | 1 | |
| curability | Skin formation time | (min) | 18 | 28 | >25 hr | 12 | 7 |
| adhesiveness | 90 degree hand peal | glass | A | A | A | B | B |
| | | anode aluminum oxide | A | B | A | B | B |

[1] colloidal calcium carbonate
[2] tin(II) neodecanoate metal (Sn) content: 22-24%
[3] Mixture of γ-aminopropyltrimethoxysilane and γ-glycidoxypropyltrimethoxysilane at a molar ratio of 1:2, which was stood under conditions of room temperature 23° C., humidity 50% for 4 weeks.
[4] 3-glycidoxypropyltrimethoxysilane
[5] $H_2NC_2H_4NHC_3H_6Si(OMe)_3$
[6] vinyl trimethoxysilane Use of a silane coupling agent (A1120) containing amino group as an adhesion-imparting agent as in Comparative Example 1 required a considerable time for curing. In contrast, use of an epoxysilane free of an amino group or a silane compound with a modified amino group, which was obtained by reacting aminosilane with epoxysilane, as an adhesion-imparting agent afforded superior curability and good adhesiveness (Examples 1 and 2). On the other hand, without using an adhesion-imparting agent, no adhesion occurred to various substrates, though curability was good (Comparative Examples 2, 3).

Examples 3-7

Comparative Examples 4-7

Using organic polymers (A-2) and (A-4) and tin(II) carboxylate salt as a catalyst, and changing the number of parts of the amino group-containing compound to be added as shown in Table 2, the skin formation time was measured and the effect of an amino group-containing compound on the curability was examined.

Under the constant temperature and humidity conditions at 23° C., 50% and according to the formulation shown in Table 2, a polymer, a curing catalyst and various additives were measured in a minicup and mixed well with an apatula. After mixing for 2 min, the mixture was left standing. This time point was taken as a curing start time, the surface was touched with the spatula every minute, and the time when the mixture did not adhere to the spatula was taken as a skin formation time to perform the measurement. The results are shown in Table 2.

TABLE 2

| composition (parts by weight) | | | Example 3 | Example 4 | Example 5 | Example 6 | Example 7 | Comparative Example 4 | Comparative Example 5 | Comparative Example 6 | Comparative Example 7 |
|---|---|---|---|---|---|---|---|---|---|---|---|
| organic polymer (A) | | A-2 | | 100 | 100 | 100 | 100 | 100 | 100 | | |
| | | A-4 | 100 | | | | | | | | |
| | | A-5 | | | | | | | | 100 | 100 |
| metal carboxylate (B) | Neostann U-50[1] | Nitto Kasei Co., Ltd. | 3.4 | | 3.4 | 3.4 | 3.4 | 3.4 | 3.4 | 3.4 | 3.4 |
| | Neostann U-28[2] | Nitto Kasei Co., Ltd. | | 3 | | | | | | | |
| amino group-containing compound (D) | DEAPA[3] | Wako Pure Chemical Industries, Ltd. | | | | 0.05 | 0.1 | 0.3 | 0.5 | | 0.5 |
| silane coupling agent (C) | aminosilane/epoxysilane reaction mixture[4] | | 3 | 3 | 3 | 3 | 3 | 3 | 3 | | |
| curability | Skin formation time | (min) | 2 | 1 | 1 | 1 | 3 | 15 | 20 | 150 | 27 |

[1] tin(II) neodecanoate metal (Sn) content: 22-24%
[2] tin(II) 2-ethylhexanoate metal (Sn) content: 28%
[3] 3-diethylaminopropylamine
[4] Mixture of γ-aminopropyltrimethoxysilane and γ-glycidoxypropyltrimethoxysilane at a molar ratio of 1:2, which was stood under conditions of room temperature 23° C., humidity 50% for 4 weeks.

As is clear from Table 2, good curability was maintained when the amount of the amino group-containing compound (DEAPA) contained in the mixture was less than 0.05 in the amount ratio relative to the catalyst component (B) (Examples 3-7), but the curability was markedly degraded when the ratio exceeded 0.05 (Comparative Examples 4 and 5). On the other hand, when polymer (A-5) wherein the reactive silicon group was a dimethoxymethylsilyl group alone was used, a combined use of tin(II) carboxylate salt as a catalyst and DEAPA improved the curability (Comparative Examples 6 and 7).

Examples 8-10

Comparative Example 8

In a mixture using tin(II) carboxylate salt as a catalyst, polymers of polymer (A-2) containing a trimethoxysilyl group and polymer (A-5) containing a dimethoxymethylsilyl group at various ratios were used as the organic polymer (A) and the effect on the curability was examined.

Respective polymers, catalysts and silane coupling agents were measured in minicup, and skin formation time was measured in the same manner as above. The results are shown in Table 4.

TABLE 3

| composition (parts by weight) | | | Example 8 | Example 9 | Example 10 | Comparative Example 8 |
|---|---|---|---|---|---|---|
| organic polymer (A) | A-2 | | 100 | 50 | 20 | |
| | A-5 | | | 50 | 80 | 100 |
| metal carboxylate (B) | Neostann U-50[(1)] | Nitto Kasei Co., Ltd. | 3.4 | 3.4 | 3.4 | 3.4 |
| silane coupling agent (C) | aminosilane/epoxysilane reaction mixture[(2)] | | 3 | 3 | 3 | 3 |
| curability | Skin formation time (min) | | 1 | 2 | 11 | >100 |

[(1)]tin(II) neodecanoate metal (Sn) content: 22-24%
[(2)]Mixture of γ-aminopropyltrimethoxysilane and γ-glycidoxypropyltrimethoxysilane at a molar ratio of 1:2, which was stood under conditions of room temperature 23° C., humidity 50% for 4 weeks.

From Table 3, curing took a considerable time when polymer (A-5) containing a dimethoxysilyl group alone was used as the organic polymer (A). In contrast, of the organic polymers (A), a mixture containing 20% of polymer (A-2) having a trimethoxysilyl group showed good curability. As the ratio of polymer (A-1) increased, the curability was enhanced strikingly.

Synthesis Example 6

Propylene oxide was polymerized using polyoxypropylenetriol having a molecular weight of about 3,000 as an initiator and zinc hexacyanocobaltate glyme complex as a catalyst to give polypropylene oxide having a number average molecular weight of about 26,000 (molecular weight based on polystyrene as measured using HLC-8120GPC manufactured by Tosoh Corporation as a solution delivery system, TSK-GEL H type manufactured by Tosoh Corporation as a column and THF as a solvent) and a hydroxyl group in the terminal. Subsequently, a methanol solution of 1.2-fold equivalent of NaOMe relative to the hydroxyl group of the hydroxyl group terminal polypropylene oxide was added, methanol was evaporated, and allyl chloride was further added to convert the hydroxyl group at the terminal to an allyl group. Unreacted allyl chloride was removed by evaporation under reduced pressure. The obtained crude allyl group terminal polypropylene oxide (100 parts by weight) was mixed with n-hexane (300 parts by weight) and water (300 parts by weight) and the mixture was stirred. Water was removed by centrifugation. The obtained hexane solution was mixed with water (300 parts by weight) and the mixture was stirred. Water was removed again by centrifugation and hexane was removed by evaporation under reduced pressure. From the foregoing process, three functional polypropylene oxide (P-2) having an allyl group at the terminal and a number average molecular weight of about 26,000 was obtained.

The obtained allyl terminal polypropylene oxide (P-1) (100 parts by weight) was reacted with trimethoxysilane (1.3 parts by weight) using an isopropanol solution (150 ppm) of platinum vinyl siloxane complex (platinum content 3 wt %) as a catalyst at 90° C. for 2 hr to give a trimethoxysilyl group terminal polyoxypropylene polymer (A-6). By the measurement of $^1$H-NMR (measured in $CDCl_3$ solvent using JNM-LA400 manufactured by JEOL Ltd.), the number of the trimethoxysilyl groups at the terminal was 1.9 per one molecule on average.

Examples 11-15

Comparative Example 9

Using polymer (A-6) as organic polymer (A), tin(II) carboxylate salt as a catalyst, and various silane compounds as an adhesion-imparting agent as shown in Table 4, the curability was examined.

According to the formulation shown in Table 4, polymers, catalysts and adhesion-imparting agents were measured in minicup, and skin formation time was measured in the same manner as above. The results are shown in Table 4.

TABLE 4

| composition (parts by weight) | | | Example 11 | Example 12 | Example 13 | Example 14 | Example 15 | Comparative Example 9 |
|---|---|---|---|---|---|---|---|---|
| organic polymer (A) | | A-6 | 100 | 100 | 100 | 100 | 100 | 100 |
| metal carboxylate (B) | Neostann U-50[1] | Nitto Kasei Co., Ltd. | 3.4 | 3.4 | 3.4 | 3.4 | 3.4 | 3.4 |
| adhesion-imparting agent | Y-11597[2] | Nippon Unicar Company Limited | 3.32 | | | | | |
| | A-189[3] | Nippon Unicar Company Limited | | 2.65 | | | | |
| | Y-9669[4] | Nippon Unicar Company Limited | | | 3.45 | | | |
| | Y-5187[5] | Nippon Unicar Company Limited | | | | 2.77 | | |
| | A-174[6] | Nippon Unicar Company Limited | | | | | 3.35 | |
| | A-1120[7] | Nippon Unicar Company Limited | | | | | | 3 |
| curability | tack free time | (min) | 4 | 3 | 3 | 4 | 4 | >120 |

[1]tin(II) neodecanoate metal (Sn) content: 22-24%
[2]1,3,5-N-tris(3-trimethoxysilylpropyl)isocyanurate
[3]HSC$_3$H$_6$Si(OMe)$_3$
[4]N-phenyl-γ-aminopropyltrimethoxysilane
[5]OCNC$_3$H$_6$Si(OMe)$_3$
[6]γ-methacryloyloxypropyltrimethoxysilane
[7]H$_2$NC$_2$H$_4$NHC$_3$H$_6$Si(OMe)$_3$ When an amino group-containing silane coupling agent (A1120) was used as in Comparative Example 7, the curing took a considerable time. When a silane coupling agent free of an amino group was used as component (C), good curability was observed in all cases.

Example 16

Comparative Example 10

According to the formulation shown in Table 5, organic polymer (A-2), fillers, anti-sagging agents were mixed uniformly with a three-roll mill. The mixture was dehydrated in a mixer, filled in an aluminum cartridge and used as a base material.

The base material was extruded from the cartridge just before the evaluation, metal carboxylate (B), silane coupling agent (C) and an amino group-containing compound (D) shown in Table 5 were measured and mixed therewith, and the skin formation time and adhesiveness (glass, anode aluminum oxide, polycarbonate, acrylic board and FRP) were evaluated in the same manner as above. The results are shown in Table 5.

TABLE 5

| composition (parts by weight) | | | Example 16 | Comparative Example 10 |
|---|---|---|---|---|
| organic polymer (A) | | A-2 | 100 | 100 |
| filler | Hakuenka CCR[1] | Shiraishi Calcium Kaisha, Ltd. | 50 | 50 |
| | Whiton SB[2] | Shiraishi Calcium Kaisha, Ltd. | 50 | 50 |
| anti-sagging agent | Disparlon #6500[3] | Kusumoto Chemicals, Ltd. | 2 | 2 |
| metal carboxylate (B) | Neostann U-50[4] | Nitto Kasei Co., Ltd. | 3.4 | 3.4 |
| amino group-containing compound (D) | DEAPA[5] | Wako Pure Chemical Industries, Ltd. | 0.1 | 0.3 |
| silane coupling agent (C) | A187[6] | Nippon Unicar Company Limited | 6 | 6 |
| curability | Skin formation time | (min) | 15 | 63 |
| adhesiveness | 90 degree hand peel | glass | A | A |
| | | anode aluminum oxide | A | A |
| | | polycarbonate | A | B |
| | | acrylic board | A | A |
| | | FRP | A | A |

[1]colloidal calcium carbonate
[2]ground calcium carbonate
[3]fatty acid amide wax
[4]tin(II) neodecanoate metal (Sn) content: 22-24%
[5]3-diethylaminopropylamine
[6]3-glycidoxypropyltrimethoxysilane As in the Example, when the content of DEAPA was 0.1 parts by weight, good curability and good adhesiveness were observed. On the other hand, when the content of DEAPA was increased to 0.3 parts by weight, curability was markedly degraded and the adhesiveness to polycarbonate was also insufficient.

Examples 17, 18

Comparative Examples 11, 12

According to the formulation shown in Table 6, organic polymer (A-2) and fillers were uniformly mixed with a three-roll mill and used as a base material.

The metal carboxylate (B), silane coupling agent (C), an amino group-containing compound (D) shown in Table 6 were measured and mixed, and the skin formation time was measured in the same manner as above. The results are shown in Table 6.

TABLE 6

| | | | Example | | Comparative Example | |
|---|---|---|---|---|---|---|
| composition (parts by weight) | | | 17 | 18 | 11 | 12 |
| organic polymer (A) | | A-2 | 100 | 100 | 100 | 100 |
| filler | Hakuenka CCR[1] | Shiraishi Calcium Kaisha, Ltd. | 50 | 50 | 50 | 50 |
| | Whiton SB[2] | Shiraishi Calcium Kaisha, Ltd. | 50 | 50 | 50 | 50 |
| metal carboxylate (B) | Nikka Octics iron 6% (T)[3] | NIHON KAGAKU SANGYO CO., LTD. | 6.6 | | 6.6 | |
| | Naphthex iron 5% (T)[4] | NIHON KAGAKU SANGYO CO., LTD. | | 7.9 | | 7.9 |
| amino group- containing compound (D) | DEAPA[5] | Wako Pure Chemical Industries, Ltd. | | | 0.5 | 0.5 |
| silane coupling agent (C) | A187[6] | Nippon Unicar Company Limited | 1 | 1 | 1 | 1 |
| curability | Skin formation time | (min) | 20 | 33 | 30 | 45 |

[1]colloidal calcium carbonate
[2]ground calcium carbonate
[3]mineral spirit solution of iron 2-ethylhexanoate metal (Fe) content: 6%
[4]mineral spirit solution of iron naphthenate, metal (Fe) content: 5%
[5]3-diethylaminopropylamine
[6]3-glycidoxypropyltrimethoxysilane When iron carboxylate salt was used as component (B), the curability was also degraded when the amount of the amino group-containing compound (D) was high, and good curability was shown when an amino group-containing compound was not added.

The invention claimed is:

1. A curable composition comprising
(A) 100 parts by weight of an organic polymer having a silicon-containing group capable of being crosslinked by forming a siloxane bond, wherein the main chain skeleton of the organic polymer for component (A) is at least one kind of polymer selected from the group consisting of a polyoxyalkylene polymer, a saturated hydrocarbon polymer and a (meth)acrylic acid ester polymer,
(B) 0.001-20 parts by weight of a divalent tin carboxylate which is not an organotin catalyst having a carbon-tin bond,
(C) 0.01-20 parts by weight of a silane coupling agent free of an amino group, and
(D) an unsubstituted amino group-containing compound in an amount corresponding to a weight ratio with component (B) of 0.029,
wherein a silicon-containing group wherein three hydrolyzable groups or hydroxyl groups are bonded to a silicon atom is contained as an essential silicon-containing group of component (A).

2. The curable composition of claim 1, wherein the organic polymer for component (A) has a number average molecular weight within the range of 500 to 100,000, has a reactive silicon group represented by the formula (1):

$$—SiR^1{}_{3-a}X_a \qquad (1)$$

wherein $R^1$ in the number of 3-a are each independently a substituted or unsubstituted hydrocarbon group having 1 to 20 carbon atoms, or a triorganosiloxy group represented by $$(R')_3SiO—$$

wherein R' is a substituted or unsubstituted hydrocarbon group having 1 to 20 carbon atoms, and three R's may be the same or different, X is a hydroxyl group or a hydrolyzable group, and when two or more X's are present, they may be the same or different, and a is 1, 2 or 3, on the main chain terminal and/or side chain, and a reactive silicon group of the formula (1) wherein a is 3 is contained as an essential component.

3. The curable composition of claim 2, wherein X is an alkoxy group.

4. The curable composition of claim 3, wherein the alkoxy group is a methoxy group.

5. The curable composition of claim 1, wherein, of the organic polymers for component (A), the proportion of an organic polymer having a silicon-containing group wherein three hydrolyzable groups or hydroxyl groups are bonded to a silicon atom is not less than 10%.

6. The curable composition of claim 1, wherein the main chain skeleton of the organic polymer for component (A) is at least one kind of polymer selected from the group consisting of a polyoxyalkylene polymer and a (meth)acrylic acid ester polymer.

7. The curable composition of claim 6, wherein the polyoxyalkylene polymer is a polyoxypropylene polymer.

8. The curable composition of claim 1, wherein the component (C) is a compound of a reaction product of an amino group-containing silane coupling agent and an epoxy group-containing compound, which is free of an amino group.

9. A sealing material comprising a curable composition of claim 1.

10. An adhesive comprising a curable composition of claim 1.

11. The curable composition of claim 2, wherein, of the organic polymers for component (A), the proportion of an organic polymer having a silicon-containing group wherein three hydrolyzable groups or hydroxyl groups are bonded to a silicon atom is not less than 10%.

12. The curable composition of claim 3, wherein, of the organic polymers for component (A), the proportion of an organic polymer having a silicon-containing group wherein three hydrolyzable groups or hydroxyl groups are bonded to a silicon atom is not less than 10%.

13. The curable composition of claim 4, wherein, of the organic polymers for component (A), the proportion of an organic polymer having a silicon-containing group wherein three hydrolyzable groups or hydroxyl groups are bonded to a silicon atom is not less than 10%.

14. The curable composition of claim 1, wherein the amount of composition (D) is 0-0.015 in a weight ratio relative to component (B).

* * * * *